(12) United States Patent
Kani et al.

(10) Patent No.: US 10,956,608 B2
(45) Date of Patent: Mar. 23, 2021

(54) INFORMATION PROCESSING APPARATUS, INFORMATION PROCESSING SYSTEM, AND INFORMATION PROCESSING PROGRAM

(71) Applicant: FUJITSU LIMITED, Kawasaki (JP)

(72) Inventors: Junya Kani, Kawasaki (JP); Naoki Nishiguchi, Kawasaki (JP); Miwa Okabayashi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 209 days.

(21) Appl. No.: 16/190,233

(22) Filed: Nov. 14, 2018

(65) Prior Publication Data
US 2019/0147187 A1    May 16, 2019

(30) Foreign Application Priority Data

Nov. 15, 2017    (JP) .............................. JP2017-220016

(51) Int. Cl.
*G06F 21/62* (2013.01)
*G06F 12/14* (2006.01)

(52) U.S. Cl.
CPC ...... *G06F 21/6245* (2013.01); *G06F 12/1483* (2013.01); *G06F 2212/1052* (2013.01)

(58) Field of Classification Search
CPC ............. G06F 21/6245; G06F 12/1483; G06F 2212/1052
USPC ........................................................ 726/30
See application file for complete search history.

(56) References Cited

U.S. PATENT DOCUMENTS

| | | | |
|---|---|---|---|
| 2003/0140044 A1* | 7/2003 | Mok ...................... | G06Q 50/24 |
| 2013/0055357 A1* | 2/2013 | Etchegoyen ............ | G06F 21/34 726/4 |
| 2013/0232546 A1 | 9/2013 | Shimono | |
| 2015/0205921 A1* | 7/2015 | Dick ...................... | G06F 19/00 705/2 |
| 2016/0188903 A1 | 6/2016 | Webb et al. | |
| 2016/0366125 A1 | 12/2016 | Mizuno et al. | |
| 2018/0150650 A1 | 5/2018 | Saunders et al. | |
| 2018/0211058 A1* | 7/2018 | Aunger ................. | G06F 21/602 |

FOREIGN PATENT DOCUMENTS

| | | |
|---|---|---|
| JP | 2013-182460 | 9/2013 |
| WO | 2015/017897 A1 | 2/2015 |
| WO | 2015/125290 | 8/2015 |

(Continued)

OTHER PUBLICATIONS

Vora et al., Ensuring Privacy and Security in E-Health Records, IEEE, 978-1-5386-4599-4/18, 2018 (Year: 2018).*

(Continued)

*Primary Examiner* — Peter C Shaw
(74) *Attorney, Agent, or Firm* — Fujitsu Patent Center

(57) ABSTRACT

An information processing apparatus includes a memory, and a processor coupled to the memory and configured to control, in an event of access to personal data of a user in a case where personal data is stored in a data region for each individual user, an access right to access the personal data of the user for an account that accesses the personal data of the user, based on a relation between the account and the user and a situation in which the account accesses the personal data of the user.

8 Claims, 40 Drawing Sheets

(56) References Cited

FOREIGN PATENT DOCUMENTS

WO    2016/0123359 A1    8/2016

OTHER PUBLICATIONS

Russello et al. "A Workflow-Based Access Control Framework for e-Health Applications," 22nd International Conference on Advanced Information Networking and Applications—Workshops, Okinawa, 2008, pp. 111-120, doi: 10.1109/WAINA.2008.131 (Year: 2008).*
Uddin et al., "A Dynamic Access Control Model Using Authorising Workflow and Task-Role-Based Access Control", in IEEE Access, vol. 7, pp. 166676-166689, 2019, doi: 10.1109/ACCESS.2019.2947377 (Year: 2019).*
EESR—Extended European Search Report of European Patent Application No. 18203062.7 dated Mar. 28, 2019.

* cited by examiner

| DELIVERER | |
|---|---|
| RELATION | DELIVERY CUSTOMER A: CUSTOMER |
| ROLE | DELIVERY CUSTOMER A:<br>RIGHT TO Write HOME DELIVERY INFORMATION |
| SCRIPT | NOTIFICATION SCRIPT |
| RULE | RULE TO CALL NOTIFICATION SCRIPT UPON CHANGE IN HOME DELIVERY INFORMATION |

| DELIVERY CUSTOMER A | |
|---|---|
| RELATION | DELIVERER: HOME DELIVERY AGENT |
| ROLE | DELIVERER:<br>· RIGHT TO Read HOME-STAYING INFORMATION<br>· RIGHT TO Read HOMECOMING STATUS |
| SCRIPT | · HOME-STAYING CHECK SCRIPT<br>· HOMECOMING STATUS CHECK SCRIPT<br>· AUTOMATIC APPROVAL SCRIPT |
| RULE | RULE TO REGULARLY EXECUTE HOME-STAYING CHECK AND HOMECOMING CHECK SCRIPT |

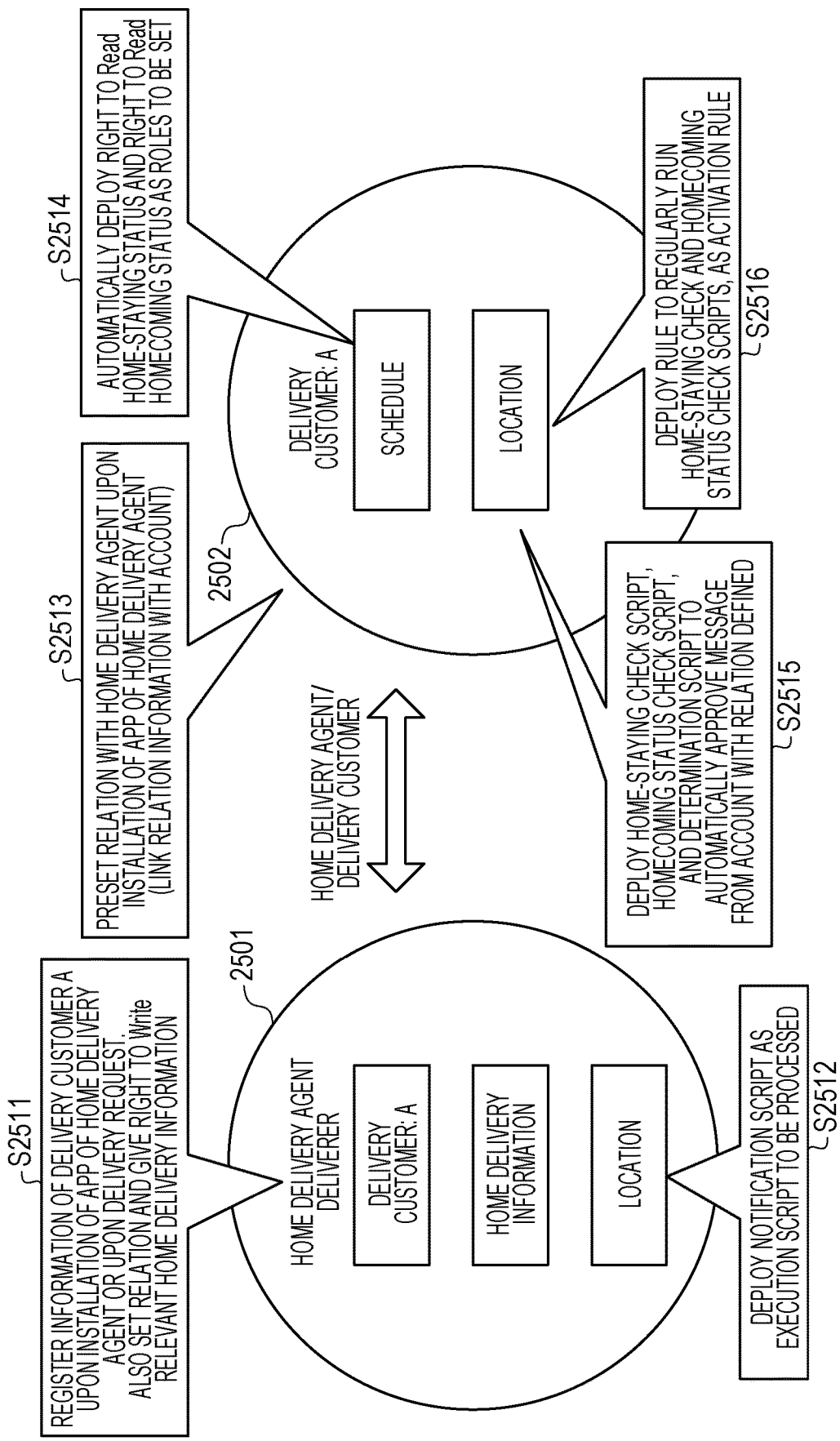

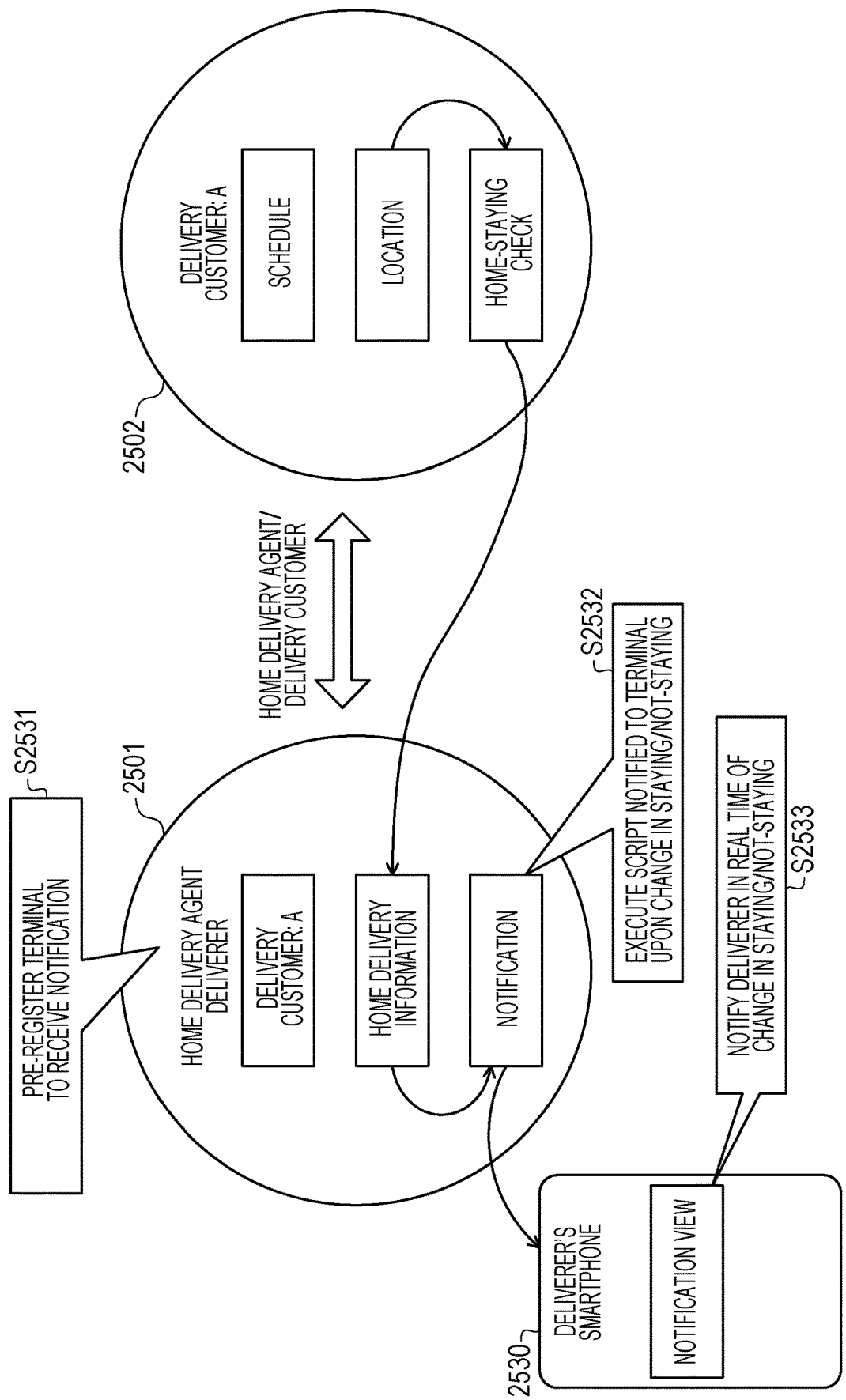

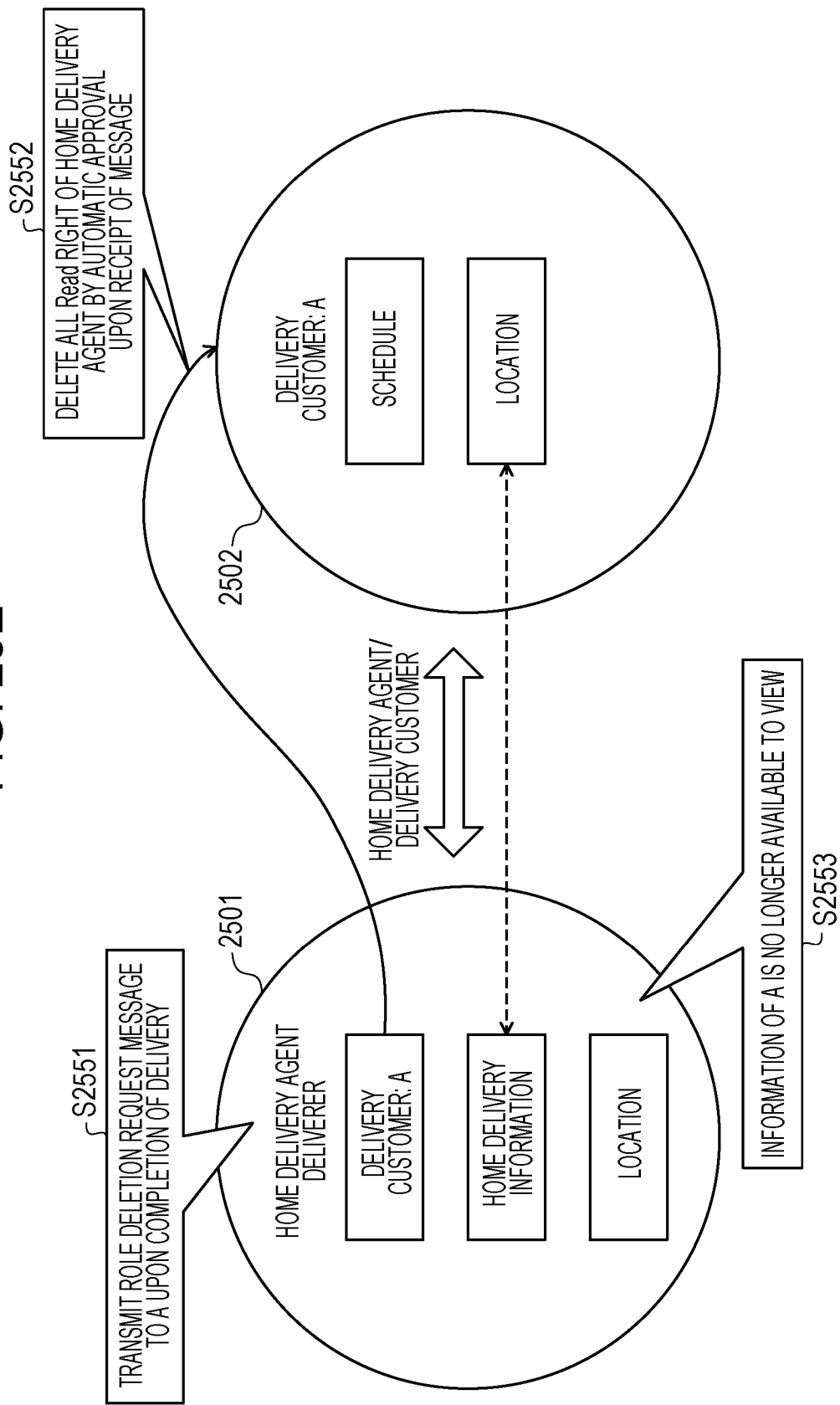

| DOCTOR | |
|---|---|
| RELATION | PATIENT A: PATIENT |
| ROLE | PATIENT A:<br>RIGHT TO Write APPOINTMENT INFORMATION |
| SCRIPT | |
| RULE | |

| PATIENT A/<br>EMERGENCY CASE | |
|---|---|
| RELATION | DOCTOR: DOCTOR IN CHARGE |
| ROLE | DOCTOR:<br>RIGHT TO Read PERSONAL INFORMATION<br><br>THIRD PARTY (IN CASE OF EMERGENCY):<br>RIGHT TO Read PERSONAL INFORMATION |
| SCRIPT | DETERMINATION SCRIPT |
| RULE | RULE TO AUTOMATICALLY APPROVE UPON<br>RECEIPT OF MESSAGE |

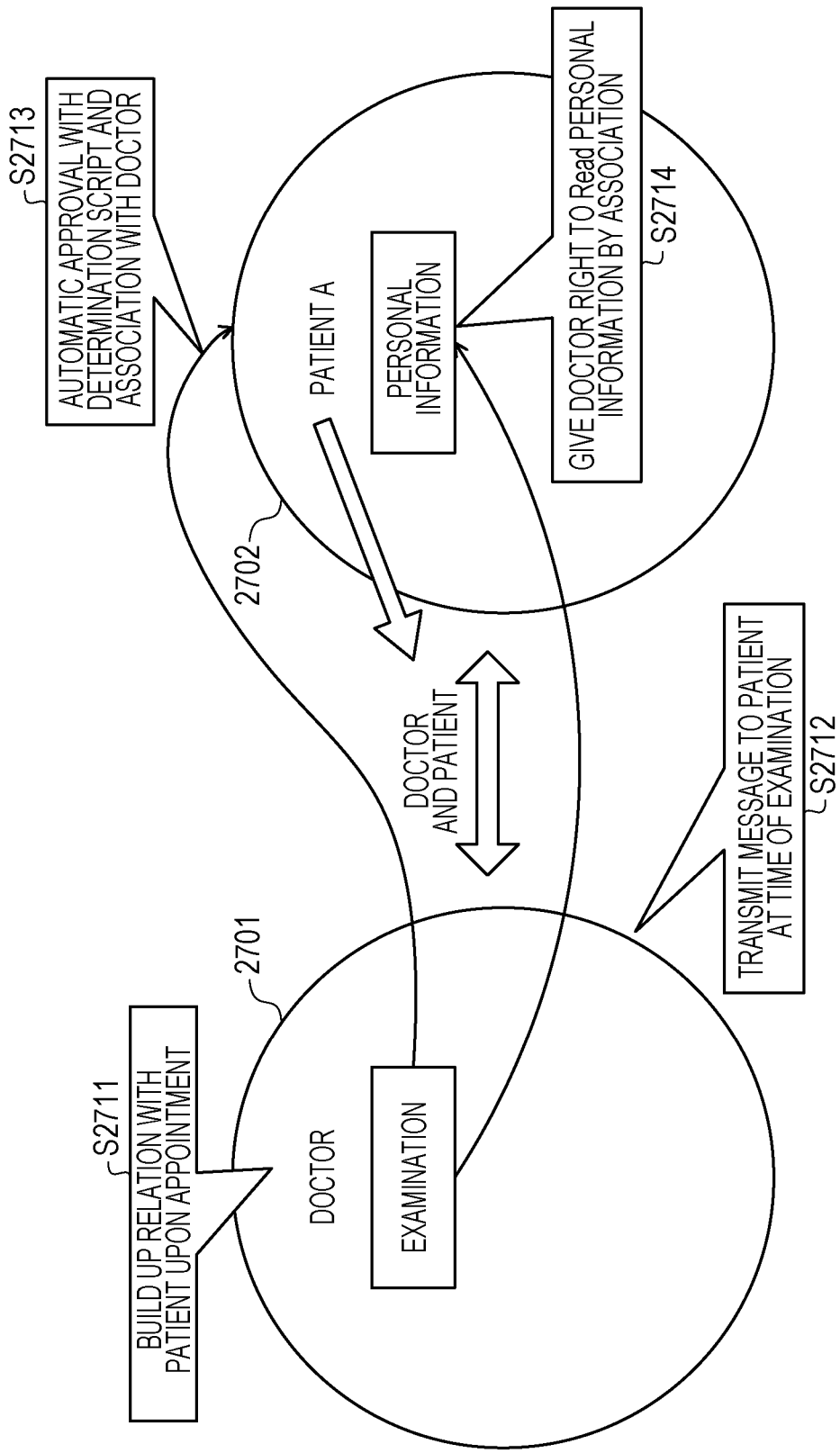

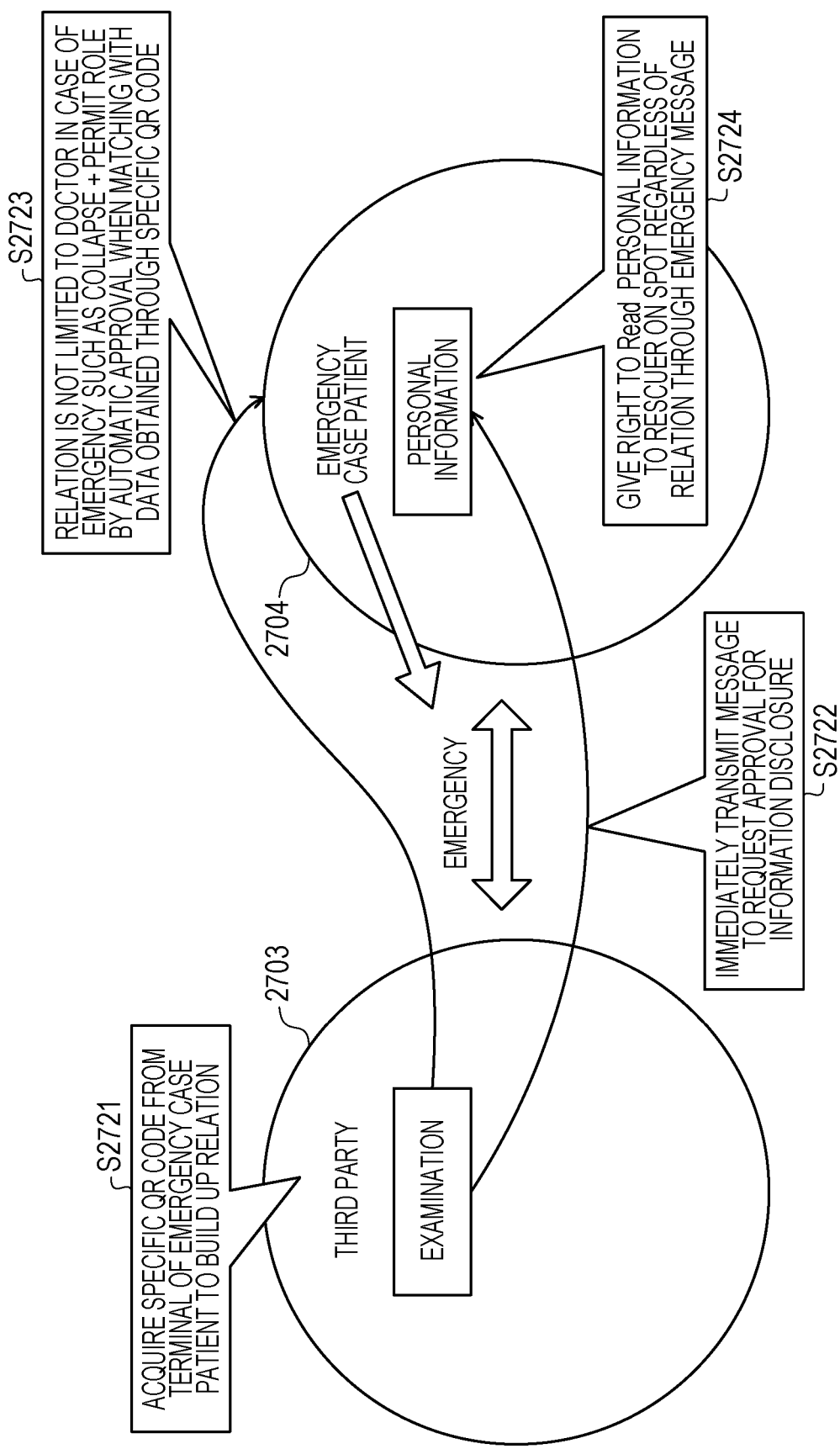

| SUPERIOR | |
|---|---|
| RELATION | SUBORDINATE A: COLLEAGUE, SUBORDINATE |
| ROLE | SUBORDINATE A:<br>RIGHT TO Read SCHEDULE |
| SCRIPT | · SCHEDULE WRITE SCRIPT<br>· DETERMINATION SCRIPT<br>· 10-MINUTE-BEFORE NOTIFICATION SCRIPT |
| RULE | · WRITE SCHEDULE OF MEMBER (SUBORDINATE) ONCE SCHEDULE IS ADDED<br>· NOTIFY WHEN SCHEDULE IS CHANGED<br>· AUTOMATICALLY APPROVE UPON RECEIPT OF MESSAGE FROM ACCOUNT WITH RELATION DEFINED<br>· NOTIFY 10 MINUTES BEFORE START |

| SUBORDINATE A | |
|---|---|
| RELATION | SUPERIOR: COLLEAGUE, ORGANIZER |
| ROLE | SUPERIOR:<br>· RIGHT TO Read/Write SCHEDULE<br>· RIGHT TO Read LOCATION<br>· RIGHT TO Read MATERIAL |
| SCRIPT | · NOTIFICATION SCRIPT<br>· DETERMINATION SCRIPT |
| RULE | · RULE TO UPDATE SCHEDULE INFORMATION OF SUPERIOR UPON UPDATE OF MATERIAL |

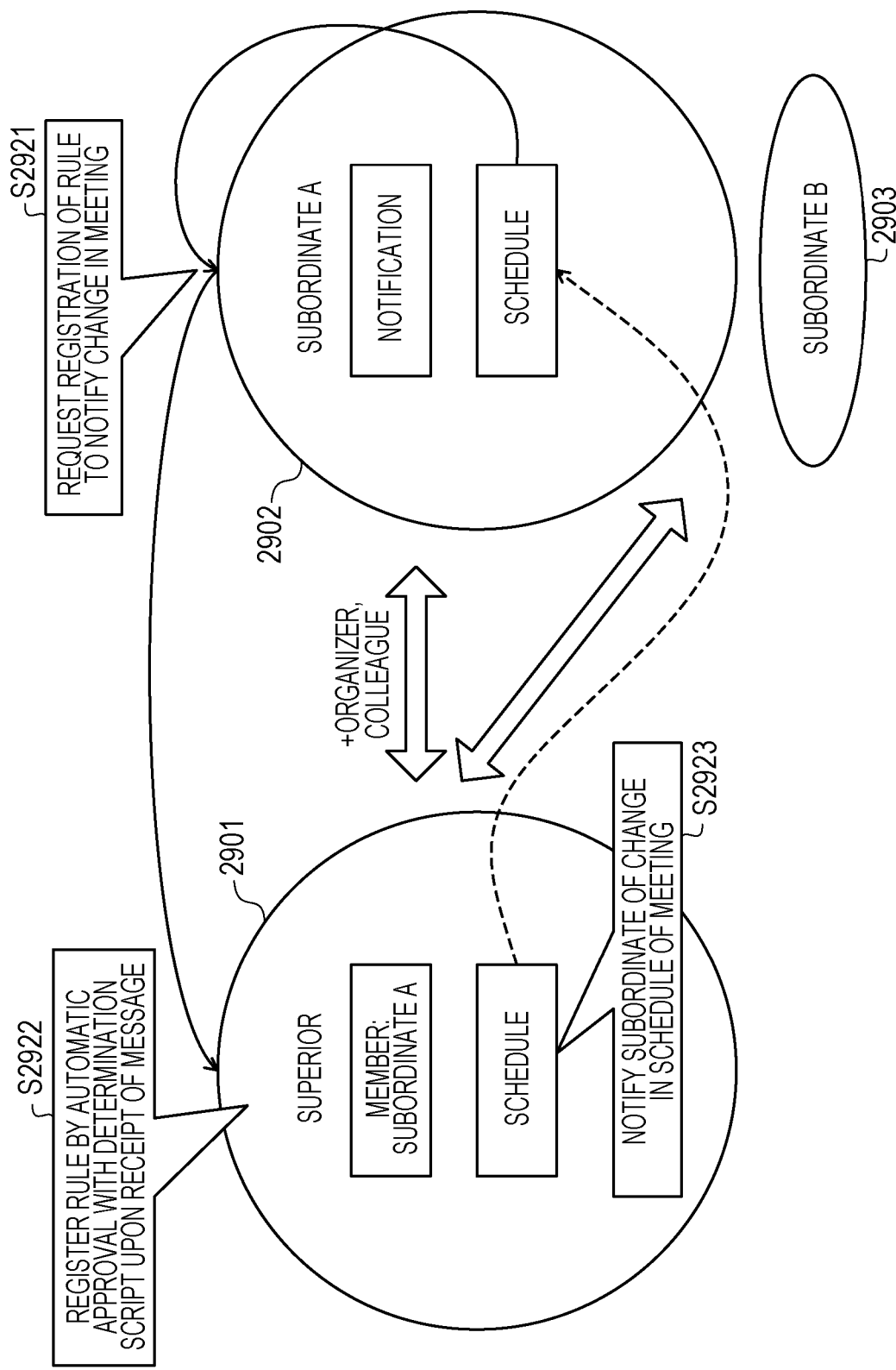

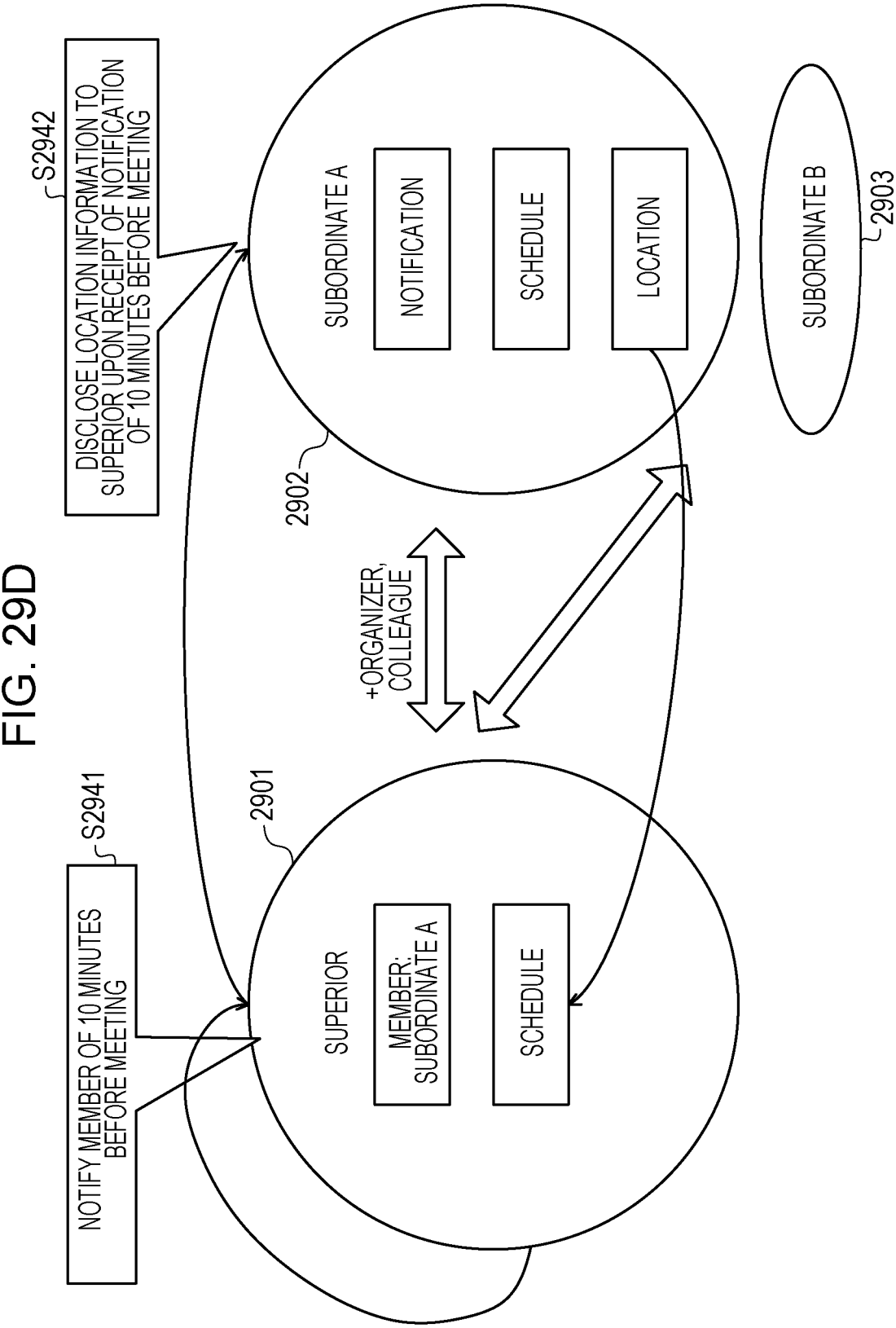

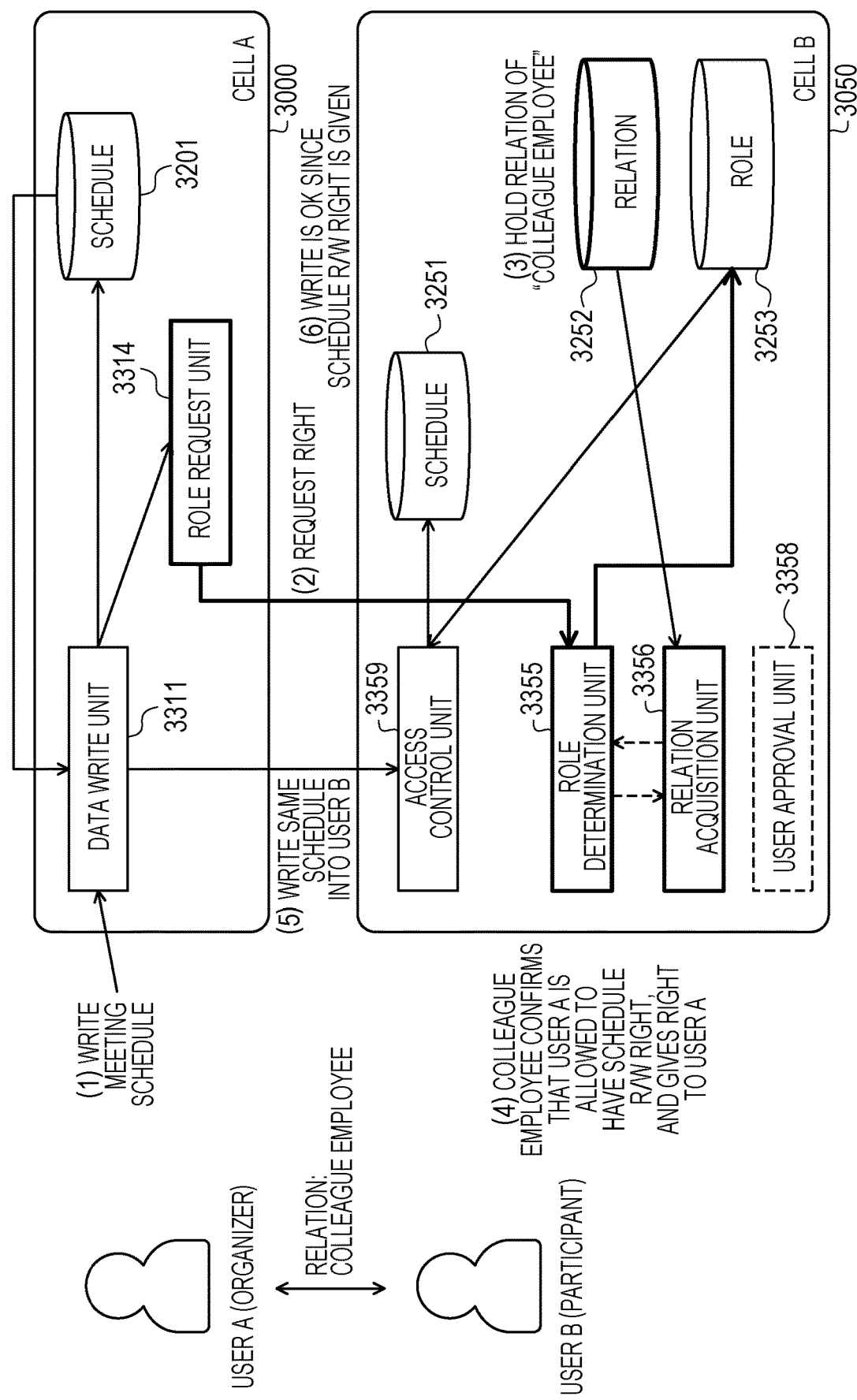

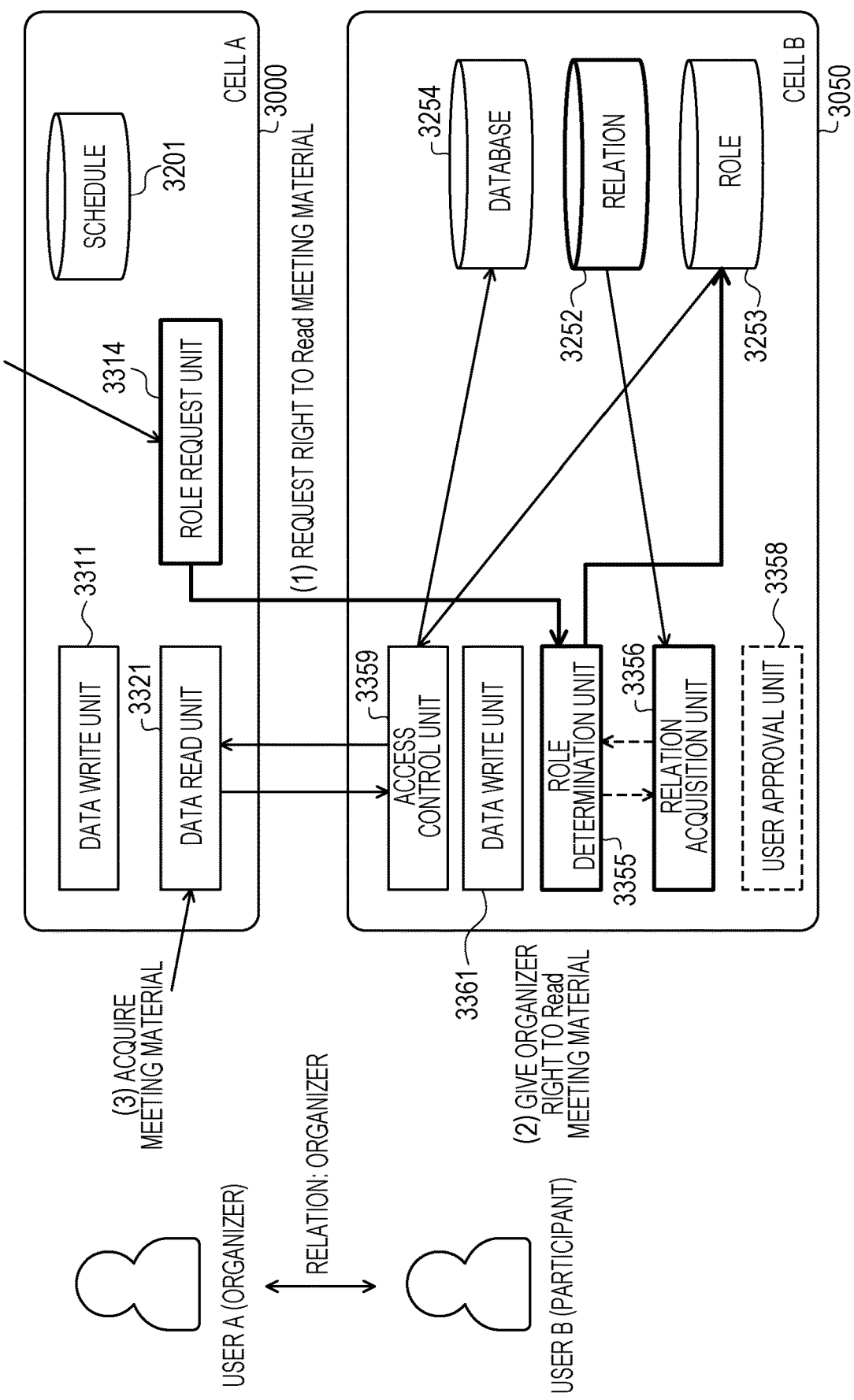

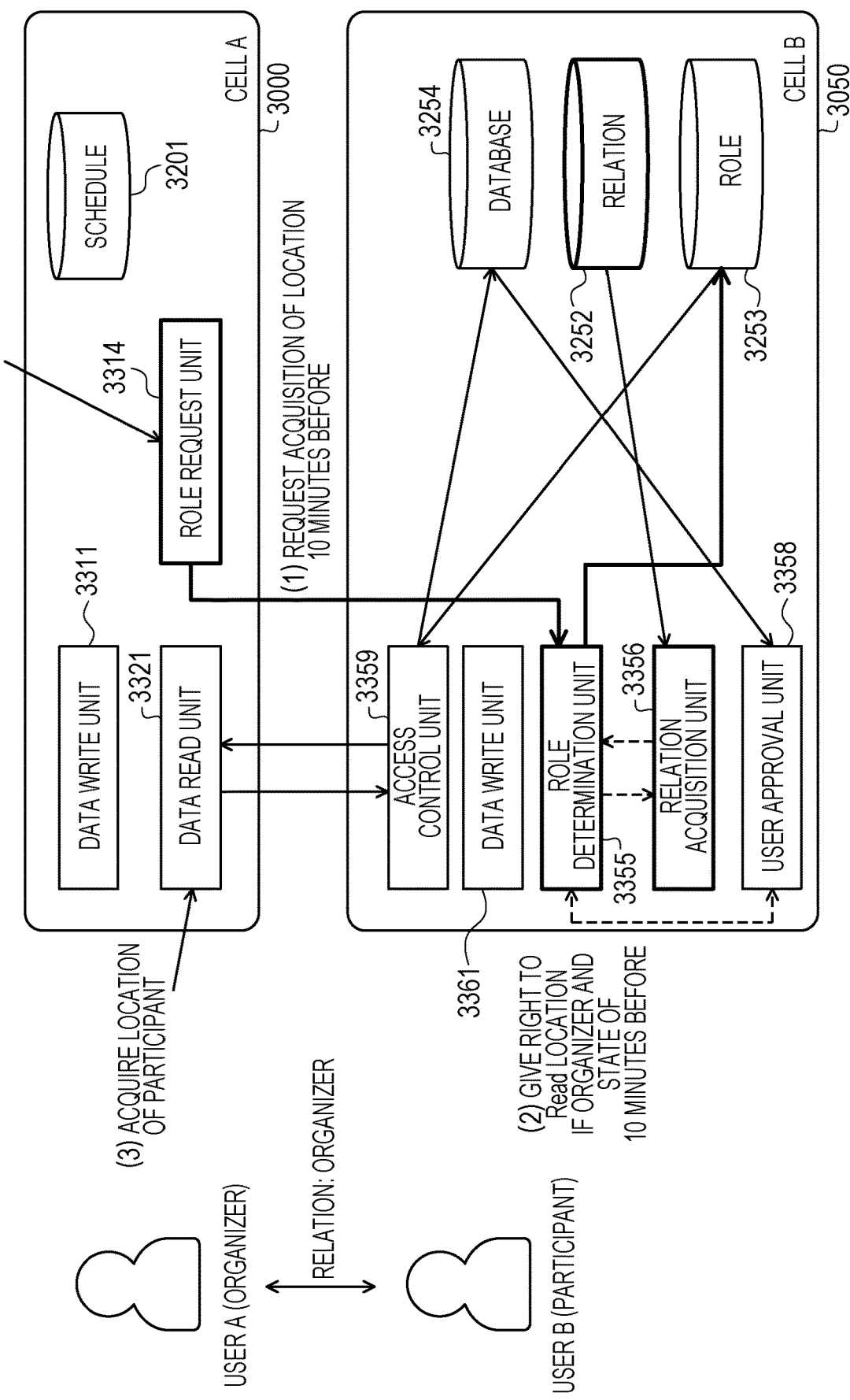

INFORMATION PROCESSING APPARATUS, INFORMATION PROCESSING SYSTEM, AND INFORMATION PROCESSING PROGRAM

CROSS-REFERENCE TO RELATED APPLICATION

This application is based upon and claims the benefit of priority of the prior Japanese Patent Application No. 2017-220016, filed on Nov. 15, 2017, the entire contents of which are incorporated herein by reference.

FIELD

The embodiments discussed herein are related to an information processing apparatus, an information processing system, and an information processing program.

BACKGROUND

There has heretofore been a "personal data store (PDS)" that is a mechanism capable of collecting personal data (personal information) on a person distributed on a network under the control of the person himself/herself and using and applying the collected data by distributing the data among various services, as well as a service on the cloud providing such functions, an apparatus or a system that provides the service.

As a related art, there is a technique that enables appropriate determination of the role of a user authorized by another apparatus on a provided service (see, for example, Japanese Laid-open Patent Publication No. 2013-182460). There is also a technique that provides services more efficiently by use of an authorization token containing role information (see, for example, International Publication No. WO 2015/125290).

However, in the related art, when each individual has his/her own data region and a data user is different from a data holder, data of the data holder may not be used by the data user unless the data holder gives an access right to the data user. In this case, the data user makes a request for an access right and is given the right to use the data by the holder giving approval to the request for the access right. This leads to a problem that it is cumbersome for the holder to give approval to every request for the access right.

SUMMARY

According to an aspect of the embodiments, an information processing apparatus includes a memory, and a processor coupled to the memory and configured to control, in an event of access to personal data of a user in a case where personal data is stored in a data region for each individual user, an access right to access the personal data of the user for an account that accesses the personal data of the user, based on a relation between the account and the user and a situation in which the account accesses the personal data of the user.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 24A is an explanatory diagram illustrating an example of data set for a user (deliverer) according to Example 1 (providing a home delivery agent with home-staying/not-staying information);

FIG. 24B is an explanatory diagram illustrating an example of data set for a user (delivery customer A) according to Example 1;

FIGS. 25A to 25E are explanatory diagrams each illustrating an example of processing according to Example 1 (providing the home delivery agent with home-staying/not-staying information);

FIG. 26A is an explanatory diagram illustrating an example of data set for a user (doctor) according to Example 2 (providing medical information);

FIG. 26B is an explanatory diagram illustrating an example of data set for a user (patient A/emergency patient) according to Example 2;

FIGS. 27A and 27B are explanatory diagrams each illustrating an example of processing according to Example 2 (providing medical information);

FIG. 28A is an explanatory diagram illustrating an example of data set for a user (superior) according to Example 3 (sharing meeting schedule information by a superior and a subordinate);

FIG. 28B is an explanatory diagram illustrating an example of data set for a user (subordinate A) according to Example 3;

FIGS. 29A to 29D are explanatory diagrams each illustrating an example of processing according to Example 3 (sharing the meeting schedule information by the superior and the subordinate); and FIGS. 30A to 30D are explanatory diagrams each illustrating an example of the processing according to Example 3 using the functional configurations of the cells.

DESCRIPTION OF EMBODIMENTS

Hereinafter, with reference to the drawings, detailed description is given of embodiments of an information processing apparatus, an information processing system, and an information processing program.

System Configuration Example

Figure 1:
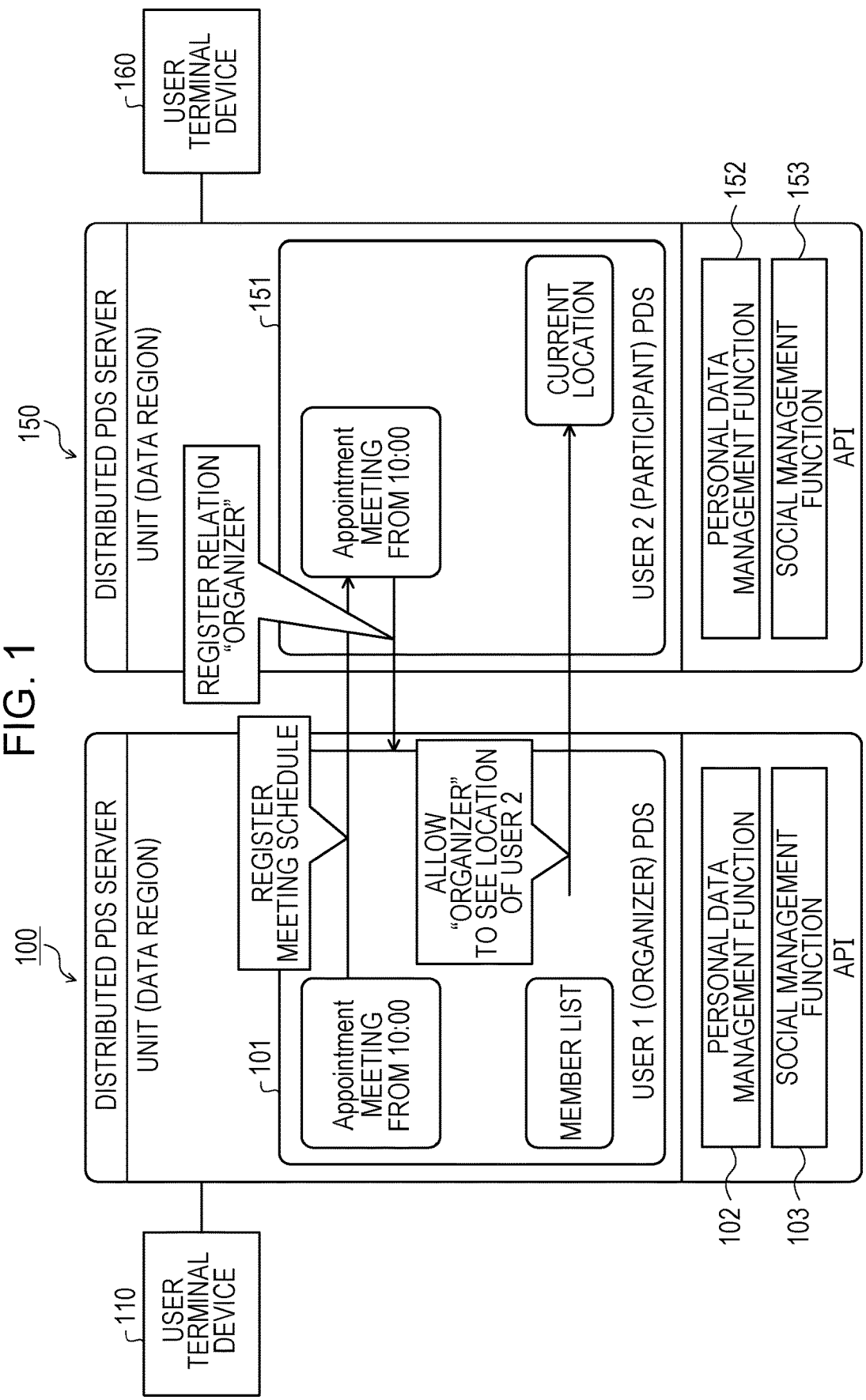
FIG. 1 is an explanatory diagram illustrating an example of an overview of an information processing apparatus, an information processing system, and an information processing program according to an embodiment.

FIG. 1 is an explanatory diagram illustrating an example of an overview of an information processing apparatus, an information processing system, and an information processing program according to an embodiment.

In FIG. 1, the information processing system according to the embodiment includes: a plurality of distributed personal data store (PDS) servers including distributed PDS servers 100 and 150; and a plurality of user terminal devices including user terminal devices 110 and 160. The plurality of distributed PDS servers and user terminal devices are connected to each other through a network (for example, a network 206 illustrated in FIG. 2) to make up a system. Each of the distributed PDS servers may communicate with another system not illustrated in FIG. 1 through the network. The plurality of distributed PDS servers may be, for example, servers such as a Web (World Wide Web) server.

The distributed PDS servers 100 and 150 may also make up the information processing apparatus according to the embodiment. The distributed PDS servers 100 and 150 include PDSs 101 and 151 for respective users, and also include personal data management functions 102 and 152 and social management functions 103 and 153, respectively, as application programming interfaces (APIs) to be provided.

The personal data management functions 102 and 152 include cell management functions (functions to manage personal data of the user) and box management functions (functions to manage the personal data of the user in an application or a region for each application) to manage the personal data of the user.

The cell management functions include, for example, cell setting (registration/reference/change/deletion/list reference of a personal data region of the user), account setting (registration/reference/change/deletion/list reference of an account belonging to the personal data region of the user), authentication (authentication of the user), role setting (registration/reference/change/deletion/list reference of a role of the user), box setting (registration/reference/change/deletion/list reference of a data region for each application), access control (setting/reference/change of access to the user or user folder), event reception (log output upon receipt of an event to the user), and the like.

The box management functions include file operation (collection setting/file setting/access setting), database operation (schema setting/data operation), and the like.

The personal data management functions 102 and 152 may manage information and data of the user by using a unit that is the unit to manage a cell, the cell that is the unit to manage the user and the data (personal data) of the user, and a box that is a data storage region for the user.

The social management functions 103 and 153 are the function that enables disclosure control and confidentiality control of the personal data of the user by defining the relation between users for the personal data of the user. For example, external cell setting (registration/reference/change/deletion/list reference of a disclosure target user), relation setting (registration/reference/change/deletion/list reference of a relation with the disclosure target user), external role setting (registration/reference/change/deletion/list reference of a role of the disclosure target user), message transmission and reception (communication function to permit the disclosure of the personal data of the user), and the like.

As described above, the social management functions 103 and 153 enable the disclosure/confidentiality control of the personal data by defining the relation between the users for the personal data (cell). Thus, the confidentiality between the users may be kept since the personal data may be disclosed on the user's will.

Using such functions, a schedule for a meeting is registered in the user 1 (organizer) PDS 101, for example ("Appointment meeting 10:00-"). Then, in the user 2 (participant) PDS 151, a relation "organizer" is registered for the user 1 (organizer).

Once the above relation is registered, the user 1 (organizer) is given a right for the "organizer" to see the location of the "participant", based on the relation, thus allowing the user 1 (organizer) PDS 101 to acquire information on the location of the user 2 (participant) in the user 2 (participant) PDS without receiving approval by the user 2 (participant). However, if the scheduled time for the meeting has passed, the right for the "organizer" to see the location of the "participant" is discarded since the situation has changed. In this way, the access right to the PDS may be dynamically controlled based on the relation and the situation.

(Hardware Configuration Example of Information Processing Apparatus)

Figure 2:
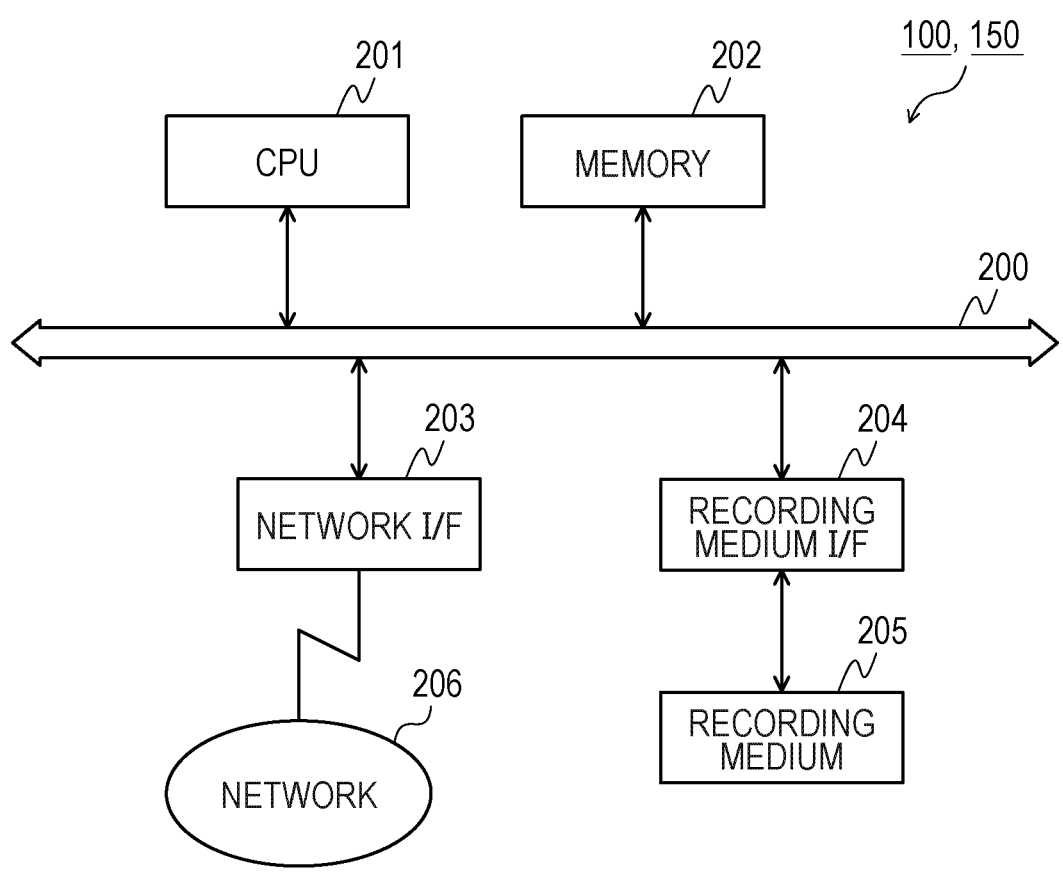
FIG. 2 is a block diagram illustrating an example of a hardware configuration of the information processing apparatus according to the embodiment.

FIG. 2 is a block diagram illustrating an example of a hardware configuration of the information processing apparatus according to the embodiment. The distributed PDS servers 100 and 150 as an example of the information processing apparatus each include a central processing unit (CPU) 201, a memory 202, a network (interface) I/F 203, a recording medium I/F 204, and a recording medium 205. The respective constituent components are connected to each other via a bus 200.

The CPU 201 performs overall control of the distributed PDS servers 100 and 150. The memory 202 includes, for example, a read only memory (ROM), a random access memory (RAM), a flash ROM, and the like. For example, the flash ROM or the ROM stores various programs, and the RAM is used as a work area for the CPU 201. The programs stored in the memory 202 are loaded into the CPU 201 to cause the CPU 201 to execute coded processing.

The network I/F 203 is connected to the network 206 through a communication line, and is connected to another apparatus (for example, another distributed PDS server, user terminal device, database, or another system) through the network 206. The network I/F 203 serves as an interface between the network 206 and the inside of its own apparatus, and controls input and output of data from and to another apparatus. As the network I/F 203, a modem, a LAN adapter, or the like may be adopted, for example.

The recording medium I/F 204 controls read/write of data from/to the recording medium 205 under the control of the CPU 201. The recording medium 205 stores data written under the control of the recording medium I/F 204. Examples of the recording medium 205 include a magnetic disk, an optical disk, and the like.

The distributed PDS servers 100 and 150 may each also include a solid state drive (SSD), a keyboard, a pointing device, a display, and the like, for example, in addition to the constituent components described above.

The user terminal devices 110 and 160 are each realized, for example, by a personal computer, a tablet terminal device, a smartphone, or the like. Although not illustrated in FIG. 2, the user terminal devices 110 and 160 each include a CPU, a memory, a display, an input device, a communication device, and the like.

(Functional Configuration of Cell in Information Processing Apparatus)

Figure 3:
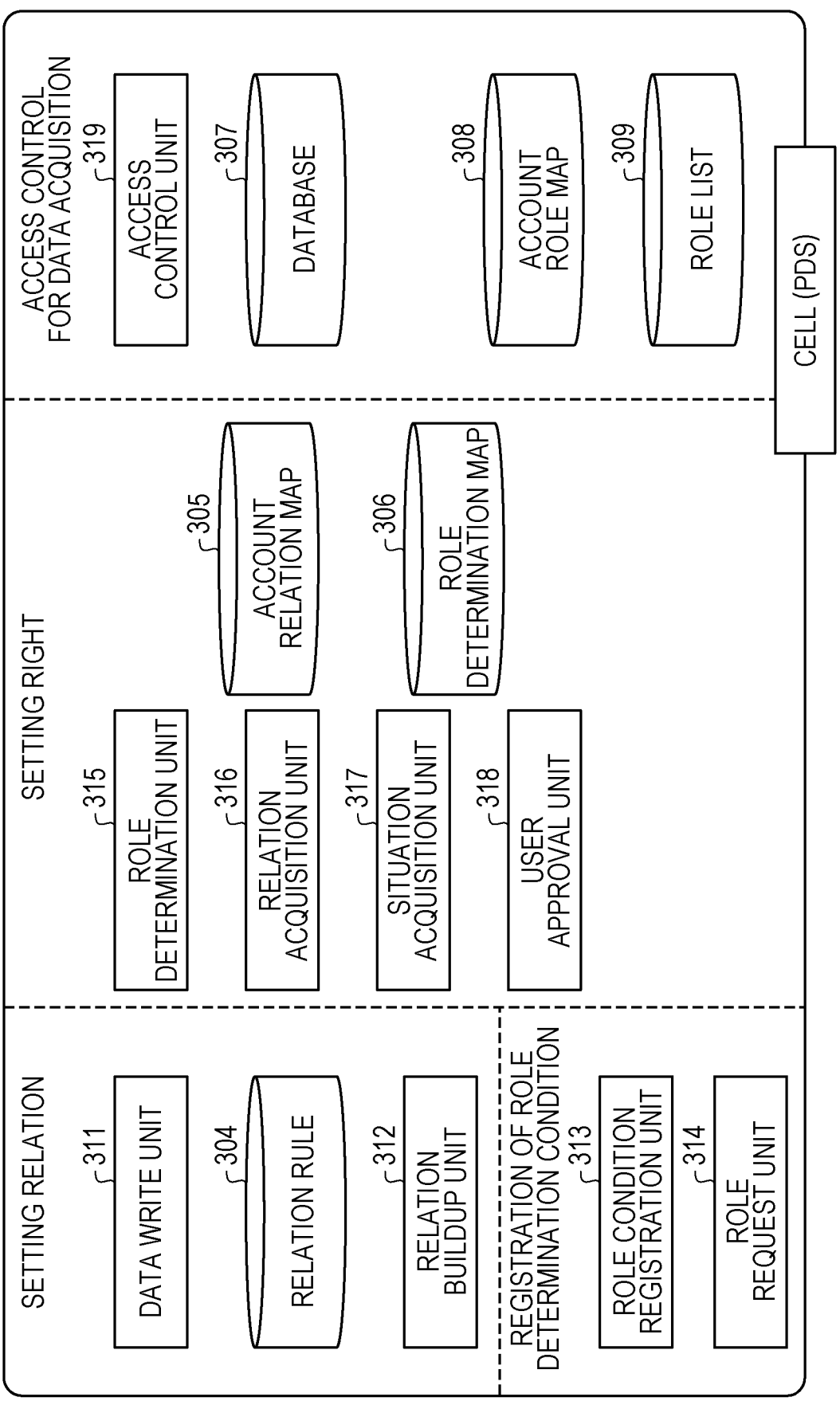
FIG. 3 is a block diagram illustrating an example of a functional configuration of cells in the information processing apparatus according to the embodiment.

FIG. 3 is a block diagram illustrating an example of a functional configuration of the cells 101 and 151 in the information processing apparatus according to the embodiment. In FIG. 3, each of the cells (PDSs) 101 and 151 in the distributed PDS servers 100 and 150 as an example of the information processing apparatus performs processing for relation setting, processing for registration of role determination conditions, processing for right setting, and processing for access control for data acquisition.

In order to execute such processing, each of the cells 101 and 151 includes various tables or data including a relation rule 304, an account relation map 305, a role determination map 306, a database 307, an account role map 308, and a role list 309, as well as constituent units including a data write unit 311, a relation buildup unit 312, a role condition registration unit 313, a role request unit 314, a role determination unit 315, a relation acquisition unit 316, a situation acquisition unit 317, a user approval unit 318, and an access control unit 319. The detailed contents of the various tables or data and the detailed contents of the respective constituent units are described later.

(Content of Relation Rule)

Figure 4:
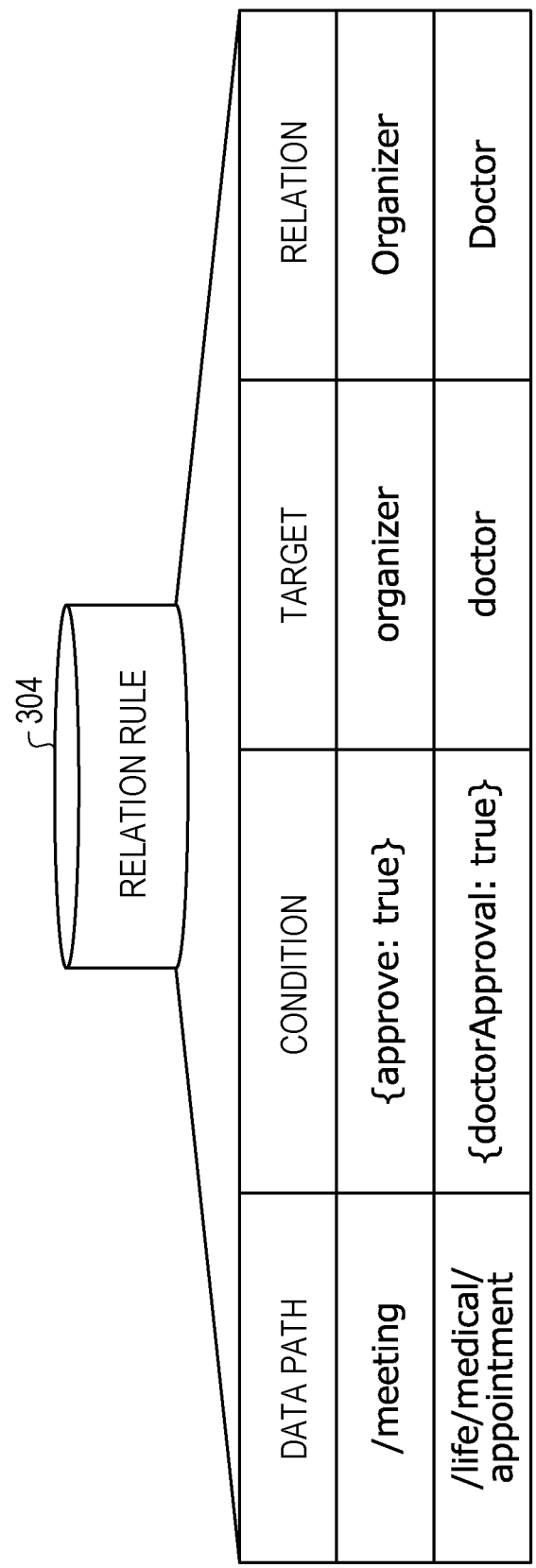
FIG. 4 is an explanatory diagram illustrating an example of a data configuration of a relation rule.

FIG. 4 is an explanatory diagram illustrating an example of a data configuration of the relation rule 304. In FIG. 4, the relation rule 304 is a table used by the relation buildup unit 312 to build up a relation. For example, the relation buildup unit 312 builds up (sets) a relation upon agreement with a rule stored in the relation rule 304.

As illustrated in FIG. 4, the relation rule 304 has, for example, a "data path" column, a "condition" column, a "target" column, and a "relation" column. By storing information in the fields formed by the respective item columns, relation rules are registered as records. Functions of the relation rule 304 may be implemented by the recording medium 205 and the like illustrated in FIG. 2, for example.

The "data path" column stores information on a path with target data. For example, the upper row of the relation rule 304 indicates that the path with target data is "/meeting". The "condition" column stores information on a parameter condition for data to build up (set) the relation. For example, the upper row of the relation rule 304 indicates that a relation is built up when "approve" is "true". Although not illustrated in FIG. 4, the parameter condition may be a threshold. For example, whether or not to build up a relation may be determined based on the threshold.

The "target" column stores information on a key of the target data. For example, the upper row of the relation rule 304 indicates that "organizer" is the key of the target data, and, in this case, is the key to store the account name of the organizer of the meeting. The "relation" column stores information on a relation to be built up. For example, the upper row of the relation rule 304 indicates that the relation to be built up is "Organizer".

As described above, the upper row of the relation rule 304 indicates that the relation "Organizer" is built up for the account stored in the key "organizer" when "approve" is "true" in the data path "/meeting". Meanwhile, the lower row thereof indicates that the relation "Doctor" is built up for the account stored in the key "doctor" when "doctorApproval" is "true" in the data path "/life/medical/appointment". This allows understanding of detailed information on a relation, such as in what situation the relation is built up, in the case of building up the relation by the relation buildup unit 312.

(Content of Account Relation Map)

Figure 5:
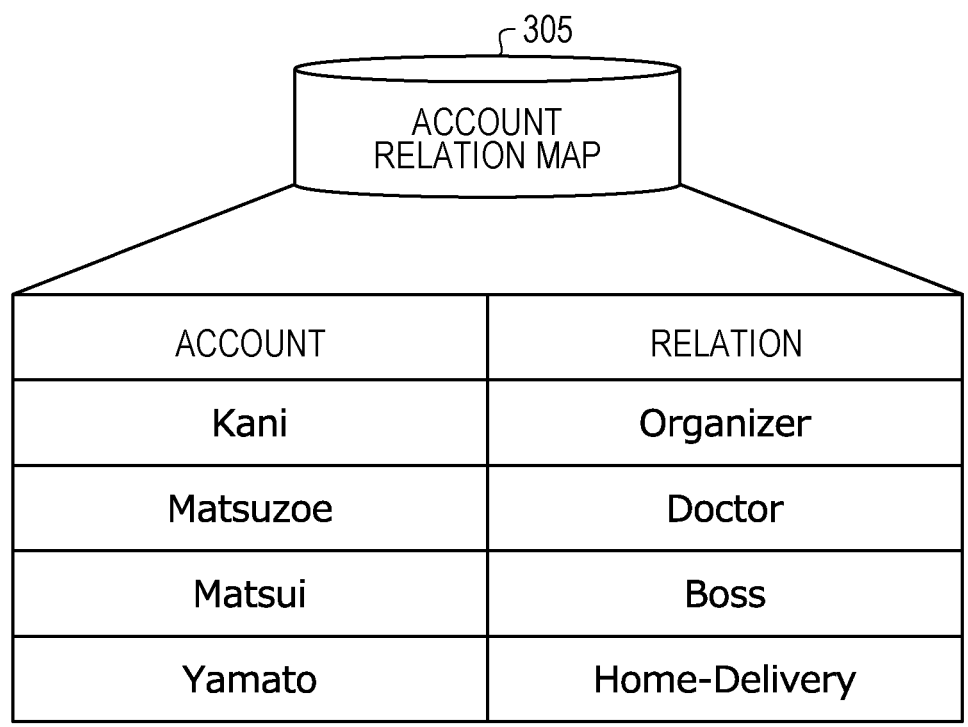
FIG. 5 is an explanatory diagram illustrating an example of a data configuration of an account relation map.

FIG. 5 is an explanatory diagram illustrating an example of a data configuration of the account relation map 305. In FIG. 5, the account relation map 305 is a table illustrating a list of relations associated (so-called linked) with accounts, in which data is written by the relation buildup unit 312.

As illustrated in FIG. 5, the account relation map 305 has, for example, an "account" column and a "relation" column. By storing information in the fields formed by the respective item columns, an account relation map is registered as a record. The account relation map 305 may have its functions realized by the recording medium 205 and the like illustrated in FIG. 2, for example.

The "account" column stores information on an account indicating a target user to be linked with a role. For example, the first row of the account relation map 305 indicates a user having a target account "Kani". The "relation" column stores information on a relation linked with the account. The first row of the account relation map 305 indicates that the relation linked with the account "Kani" is "Organizer".

Likewise, the rest of the account relation map 305 indicates that the relation linked with the account "Matsuzoe" is "Doctor", the relation linked with the account "Matsui" is "Boss (superior)", and the relation linked with the account "Yamato" is "Home-Delivery (home delivery agent)".

As described above, the account relation map 305 indicates what kind of relation each account has. The account relation map 305 is referred to by the role determination unit 315 to perform right setting processing.

(Content of Role Determination Map)

Figure 6:
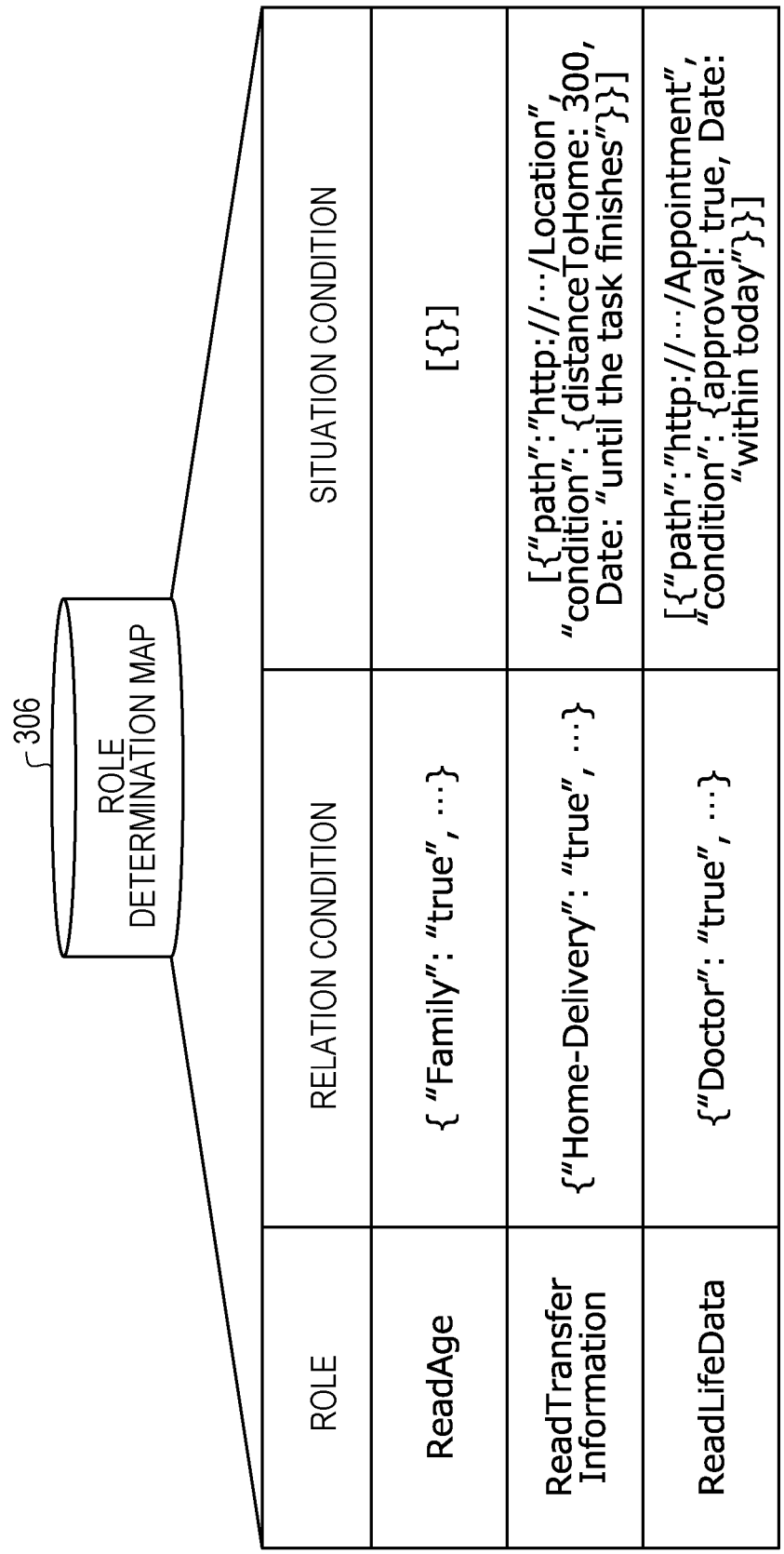
FIG. 6 is an explanatory diagram illustrating an example of a data configuration of a role determination map.

FIG. 6 is an explanatory diagram illustrating an example of a data configuration of the role determination map 306. In FIG. 6, the role determination map 306 is a table for giving a role in agreement with a rule. The role condition registration unit 313 registers data with the role determination map 306.

As illustrated in FIG. 6, the role determination map 306 has, for example, a "role" column, a "relation condition" column, and a "situation condition" column. By storing information in the fields formed by the respective item columns, a role determination map is registered as a record. The role determination map 306 may have its functions realized by the recording medium 205 and the like illustrated in FIG. 2, for example.

The "role" column stores information on a role to be given. The role is a generic term for the content of right that may be exercised by a permitted individual (account). For example, the first row of the role determination map 306 indicates that the role is "ReadAge (acquire information on age)". The content of the role is described in more detail in the "role list 309" of FIG. 9 to be described later.

The "relation condition" column stores information on a relation that permits the role. For example, the first row of the role determination map 306 indicates that the right "ReadAge" is permitted when the relation is "Family" (that is, "true").

The "situation condition" column stores (sets) information on an entity path to be referred to and conditions of data present on the path. For example, the first row of the role determination map 306 indicates that there is no situation condition since no situation condition is set ("[{ }]") and thus the role is permitted as long as the relation condition is provided in any situation.

The second row of the role determination map 306 indicates that, if a condition "distanceToHome: 300, Date: "until the task finishes (until delivery is completed within 300 m from home)"" is satisfied in the entity path " . . . /Location", a relevant role ("ReadTransferInformation (acquire information on transfer)") is permitted to a person with the relation condition (person for whom the relation "Home-Delivery (home delivery agent)" is set).

As described above, the relation condition and situation condition for each role are found out by referring to the role determination map 306. The role determination map 306 is referred to by the role determination unit 315 to perform the right setting processing.

(Data Content Stored in Database)

Figure 7:
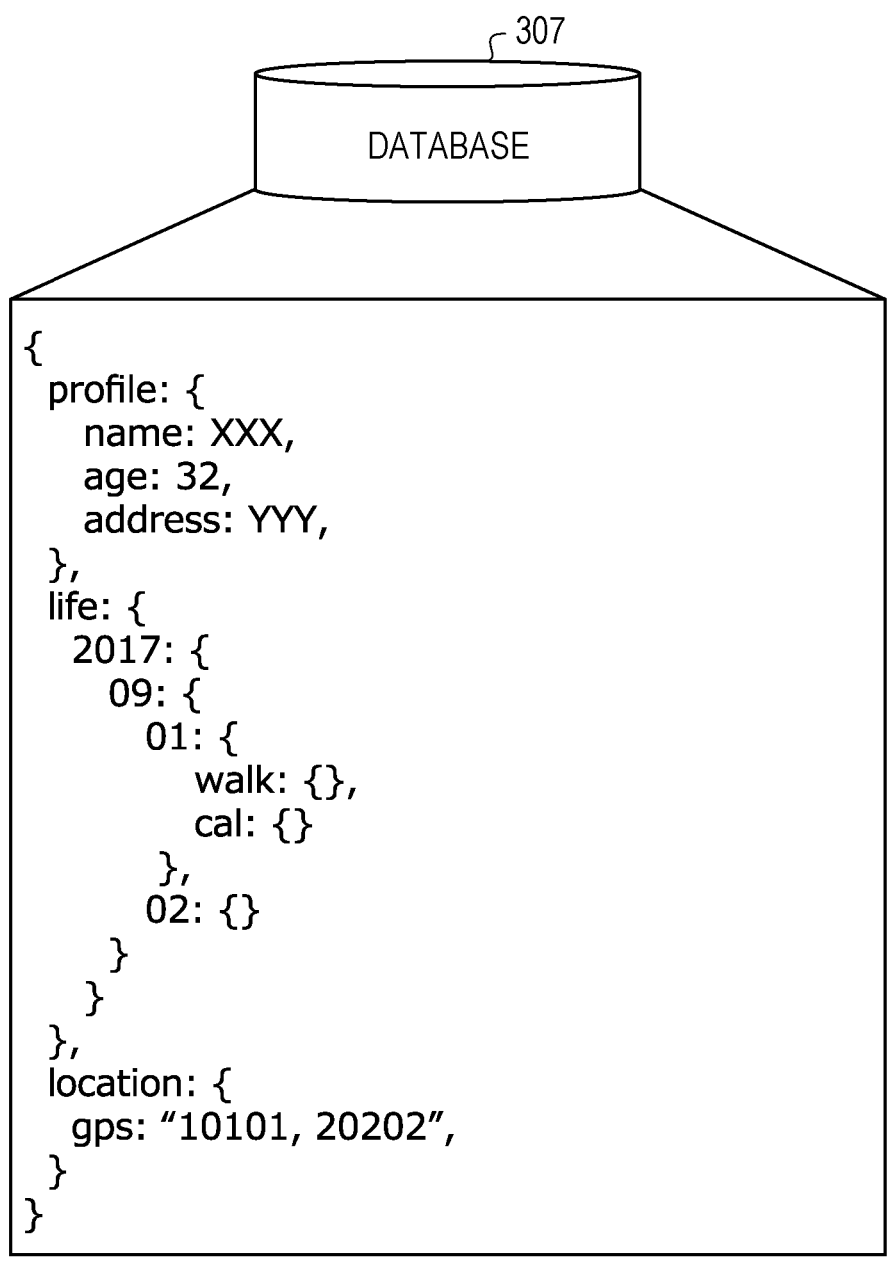
FIG. 7 is an explanatory diagram illustrating an example of data stored in a database.

FIG. 7 is an explanatory diagram illustrating an example of data stored in the database 307. As illustrated in FIG. 7, the database 307 stores various kinds of information (personal data) of each user. This data content is referred to (acquired) by the situation acquisition unit 317, and whether or not to permit access to the data (write, read, or the like) is determined based on the reference result.

The database 307 may have its functions realized by the recording medium 205 and the like illustrated in FIG. 2, for example.

(Content of Account Role Map)

Figure 8:
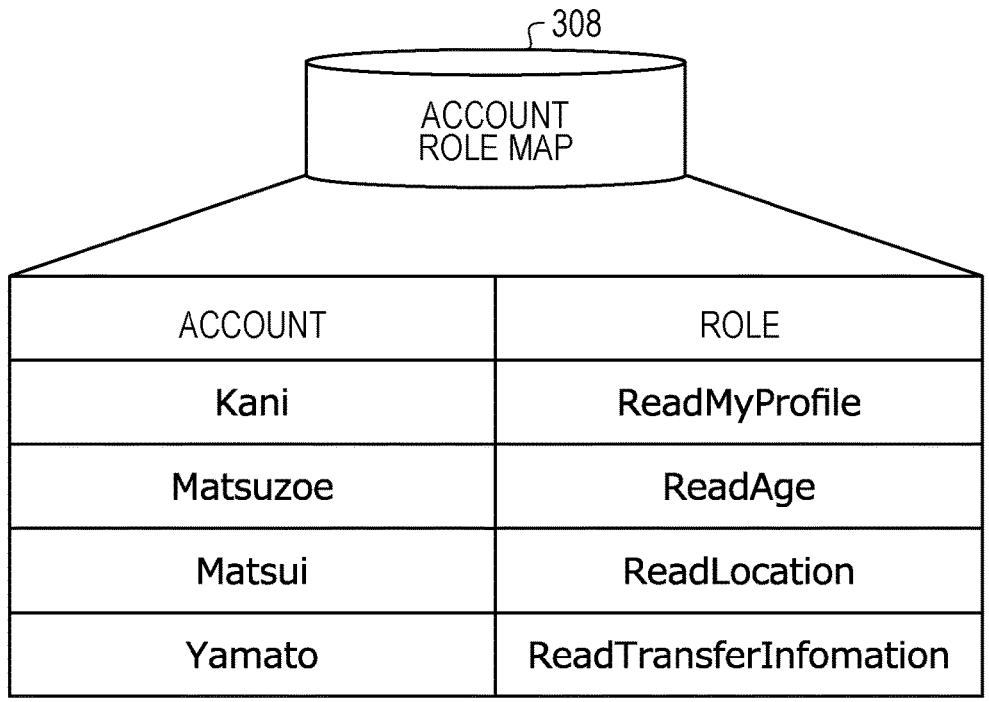
FIG. 8 is an explanatory diagram illustrating an example of a data configuration of an account role map.

FIG. 8 is an explanatory diagram illustrating an example of a data configuration of the account role map 308. In FIG. 8, the account role map 308 is a table illustrating a list of roles associated (so-called linked) with the accounts. The data in the account role map 308 is rewritten by the role determination unit 315.

As illustrated in FIG. 8, the account role map 308 has, for example, an "account" column and a "role" column. By storing information in the fields formed by the respective item columns, an account role map is registered as a record. The account role map 308 may have its functions realized by the recording medium 205 and the like illustrated in FIG. 2, for example.

The "account" column stores information on an account indicating a target user to be linked with a role, as in the case of the "account" column in the account relation map 305 illustrated in FIG. 5. The specific content of the "account" column is the same as that in the account relation map 305 illustrated in FIG. 5, and thus description thereof is omitted.

The "role" column stores information on a role to be given, as in the case of the "role" column in the role determination map 306 illustrated in FIG. 6.

Thus, a relation between an account and a role given to the account is found out by referring to the account role map 308. The account role map 308 is referred to by the access control unit 319 to perform access control processing for data acquisition.

(Content of Role List)

Figure 9:
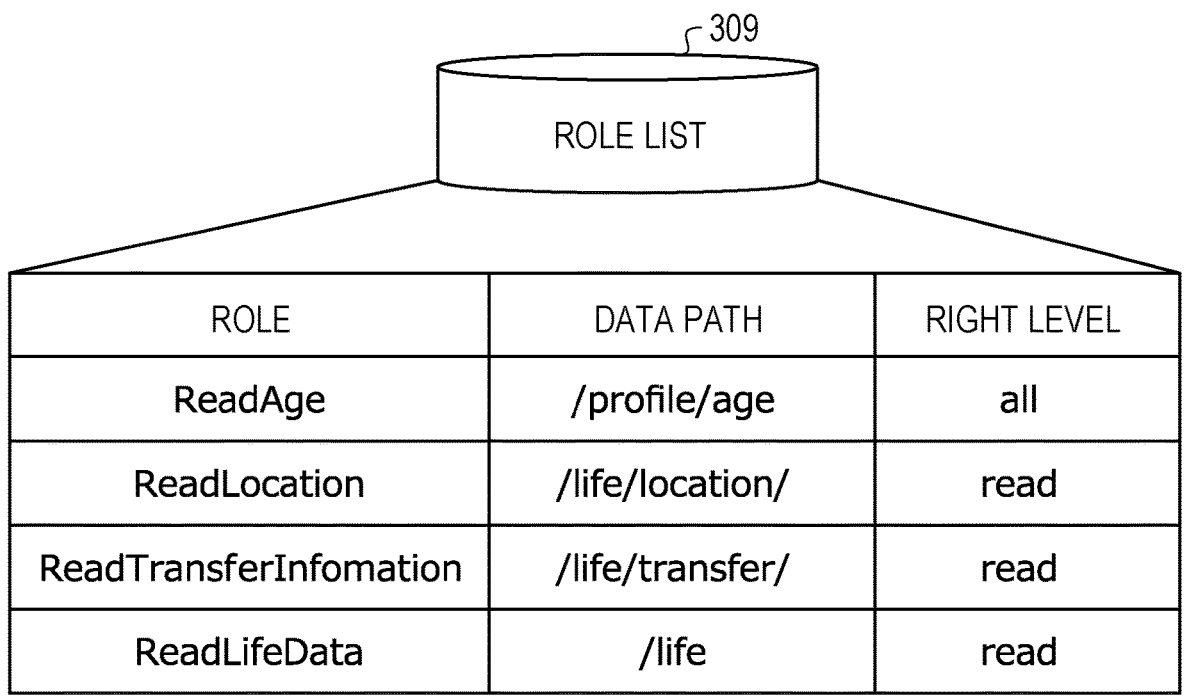
FIG. 9 is an explanatory diagram illustrating an example of a data configuration of a role list.

FIG. 9 is an explanatory diagram illustrating an example of a data configuration of the role list 309. In FIG. 9, the role list 309 is a table presenting a list of roles. The role list 309 has, for example, a "role" column, a "data path" column, and a "right level" column. By storing information in the fields formed by the respective item columns, a role list is registered as a record. The role list 309 may have its functions realized by the recording medium 205 and the like illustrated in FIG. 2, for example.

The "role" column stores information on the roles. The role is, for example, a generic term for the content of a right that may be exercised by a permitted individual (account), or the like. Therefore, detailed contents of the roles are stored in the "data path" column and the "right level" column.

The "data path" column stores information on a path with target data. The first row of the role list 309 indicates, for example, that information on "Age" that is the target for the role "ReadAge" is in "/profile/age" in the "data path" column.

The "right level" column stores information on what right is given for the target data. The right level "read" represents that the right for acquisition is given. The right level includes, besides "read", "write", "execute (execution of programs and the like)", and the like. The right level "all" represents that the right including all actions such as "read", "write", and "execute" is given.

As described above, what kind of role is stored is found out by referring to the role list 309. The role list 309 is referred to by the access control unit 319 to perform the access control processing on data.

(Setting Relation)

Figure 10:
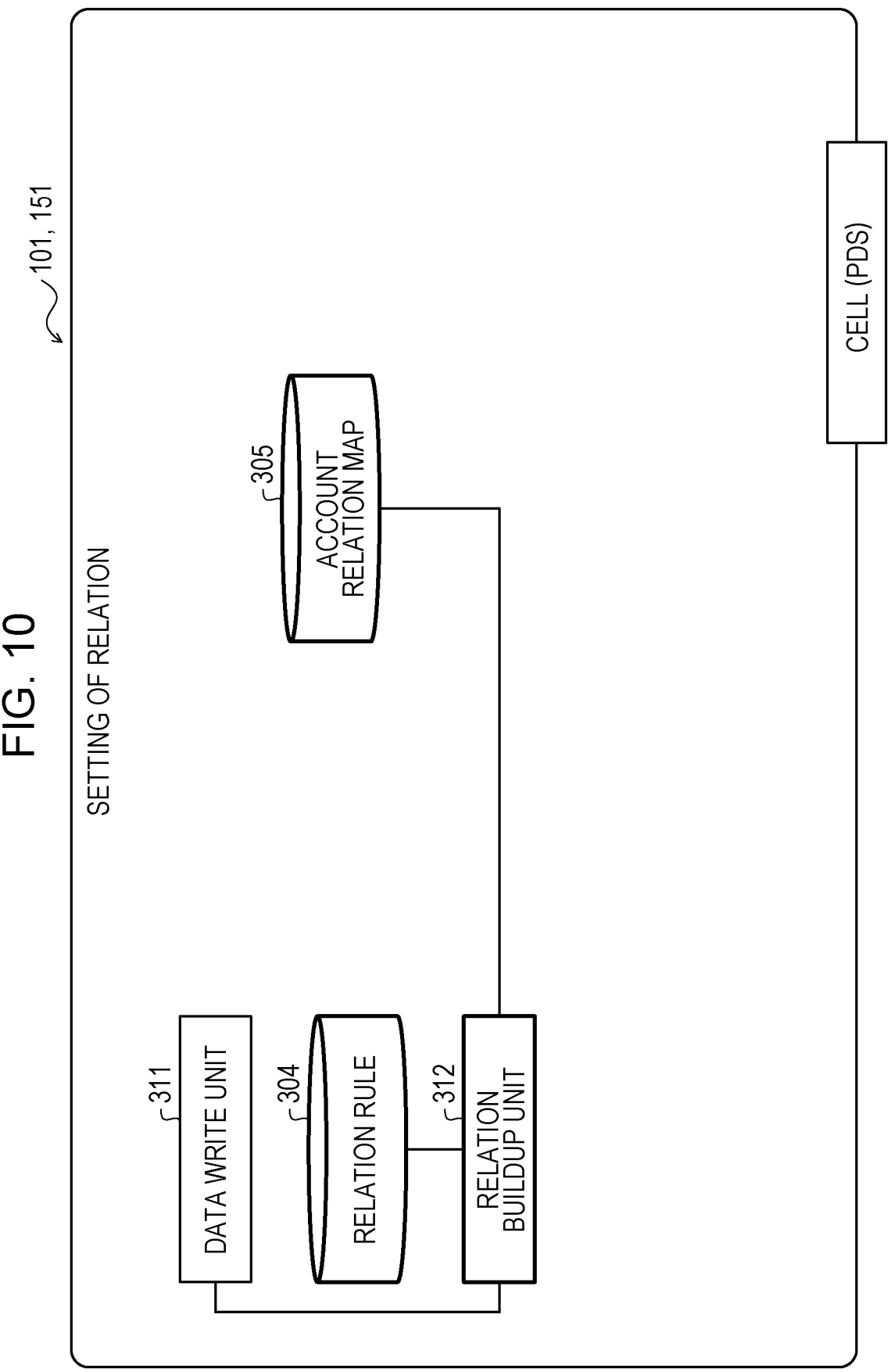
FIG. 10 is a block diagram illustrating an example of a functional configuration for setting relations in the cells.

FIG. 10 is a block diagram illustrating an example of a functional configuration for setting relations in the cells 101 and 151. In FIG. 10, the cells 101 and 151 use the data write unit 311, the relation buildup unit 312, and the like for setting relations. For example, the data write unit 311 performs simple write into the PDSs (cells 101 and 105). Then, the data write unit 311 transmits data write information to the relation buildup unit 312. The data write unit 311 may have its functions realized by the network I/F 203 and the like illustrated in FIG. 2, for example.

The relation buildup unit 312 sets a relation between its own account and another account according to a rule predefined in the relation rule 304, and the registers the relation in the account relation map 305. The relation buildup unit 312 may have its functions realized by the CPU 201, the recording medium I/F 204, and the like, for example.

Figure 11:
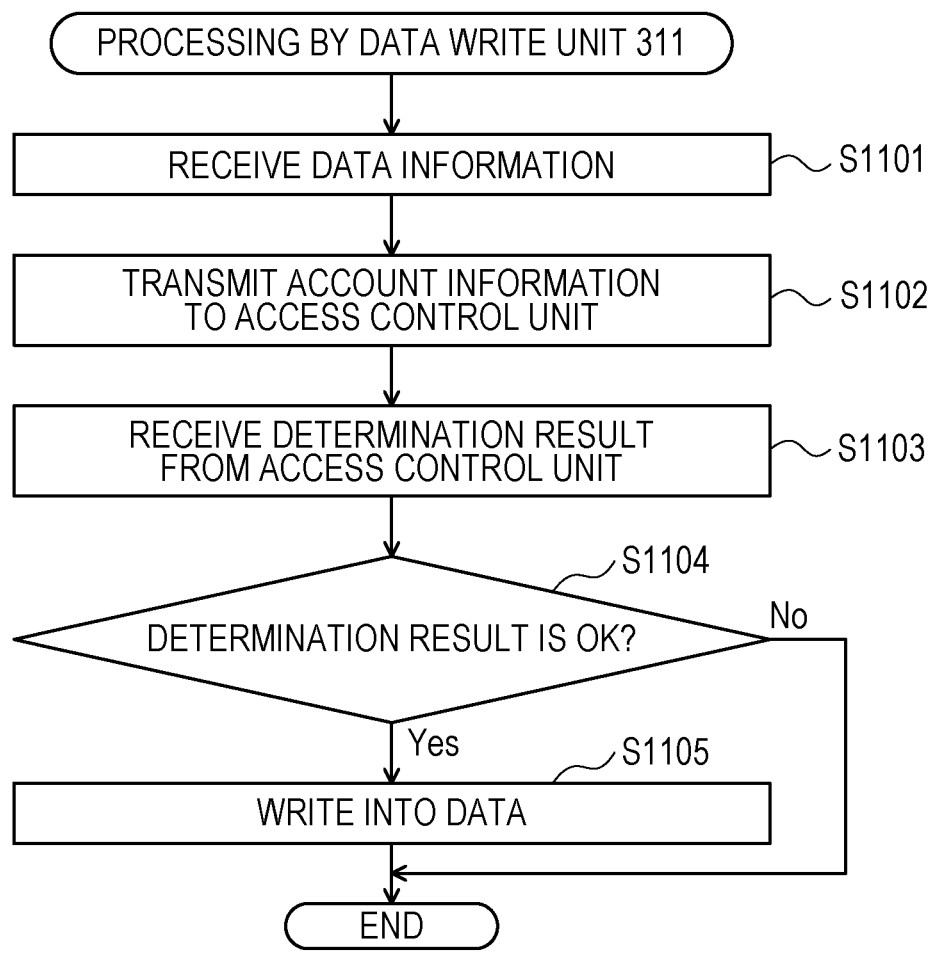
FIG. 11 is a flowchart illustrating an example of procedures performed by a data write unit.

FIG. 11 is a flowchart illustrating an example of procedures performed by the data write unit 311. In the flowchart of FIG. 11, the data write unit 311 receives data information (Step S1101). The data information is received from another cell within the same distributed PDS server, another cell in another distributed PDS server, a user terminal device, or the like, for example.

Next, the data write unit 311 transmits account information to the access control unit 319 (Step S1102), and receive a determination result from the access control unit 319 (Step S1103). The access control unit 319 determines whether or not the account information transmitted from the data write unit 311 has the right to Write (register) a relation into the account relation map 305, and transmits the determination result to the data write unit 311.

When the determination result received from the access control unit is OK, that is, write is permitted (Step S1104: Yes), the data write unit 311 performs write into data (Step S1105). For example, the data write unit 311 transmits write information (data change information) to the relation buildup unit 312. Thus, a series of processing by the data write unit 311 is completed. On the other hand, when the determination result is not OK, that is, the write is not permitted (Step S1104: No), a series of processing is terminated without doing anything.

In this way, as for the write into the PDSs (cells 101 and 105), the data write unit 311 may transmit the data write information to the relation buildup unit 312.

Figure 12:
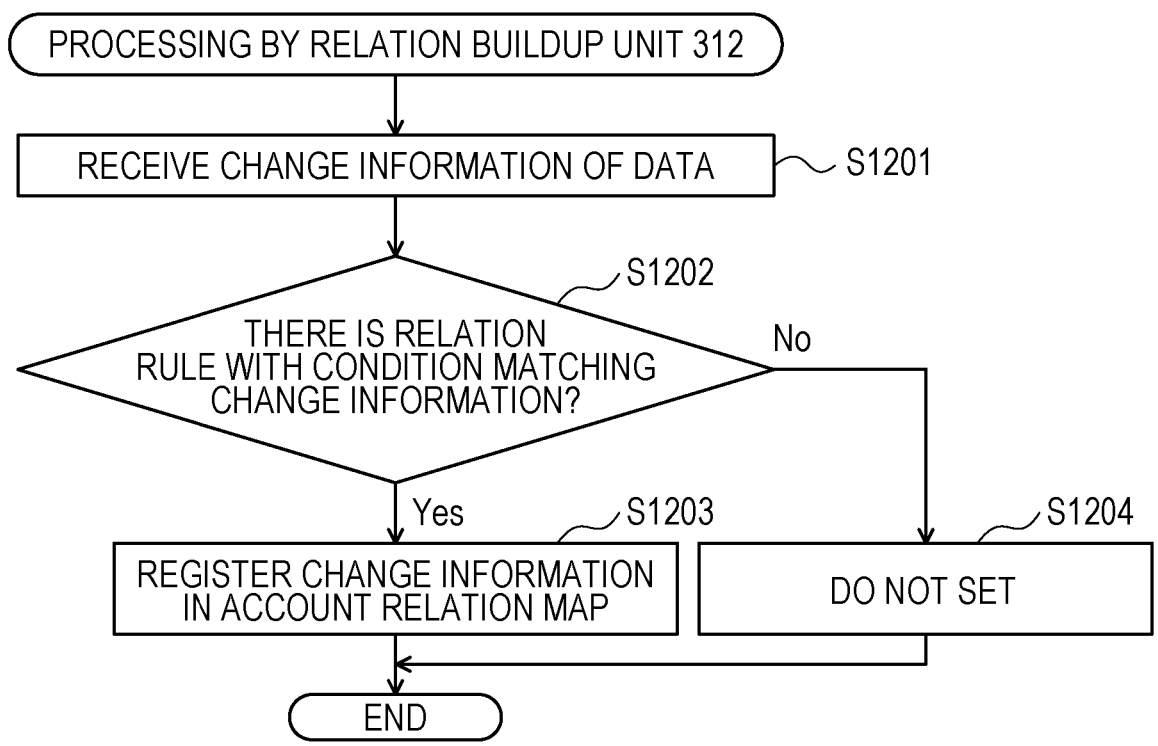
FIG. 12 is a flowchart illustrating an example of procedures performed by a relation buildup unit.

FIG. 12 is a flowchart illustrating an example of procedures performed by the relation buildup unit 312. In the flowchart of FIG. 12, the relation buildup unit 312 receives data change information (Step S1201). Then, it is determined whether or not a relation rule pre-registered in the relation rule 304 includes a condition that matches (corresponds to) the received data change information (write information) (Step S1202).

When there is a matching condition in Step S1202 (Step S1202: Yes), the change information (write information) is registered in the account relation map 305 (Step S1203) and then a series of processing is terminated. On the other hand, when there is no matching condition (Step S1202: No), a series of processing is terminated without performing any setting in the account relation map 305 (Step S1204).

In this way, the relation buildup unit 312 may build up a relation between its own account and another account according to the relation rule 304, and register the built-up content in the account relation map 305.

(Registration of Role Determination Condition)

Figure 13:
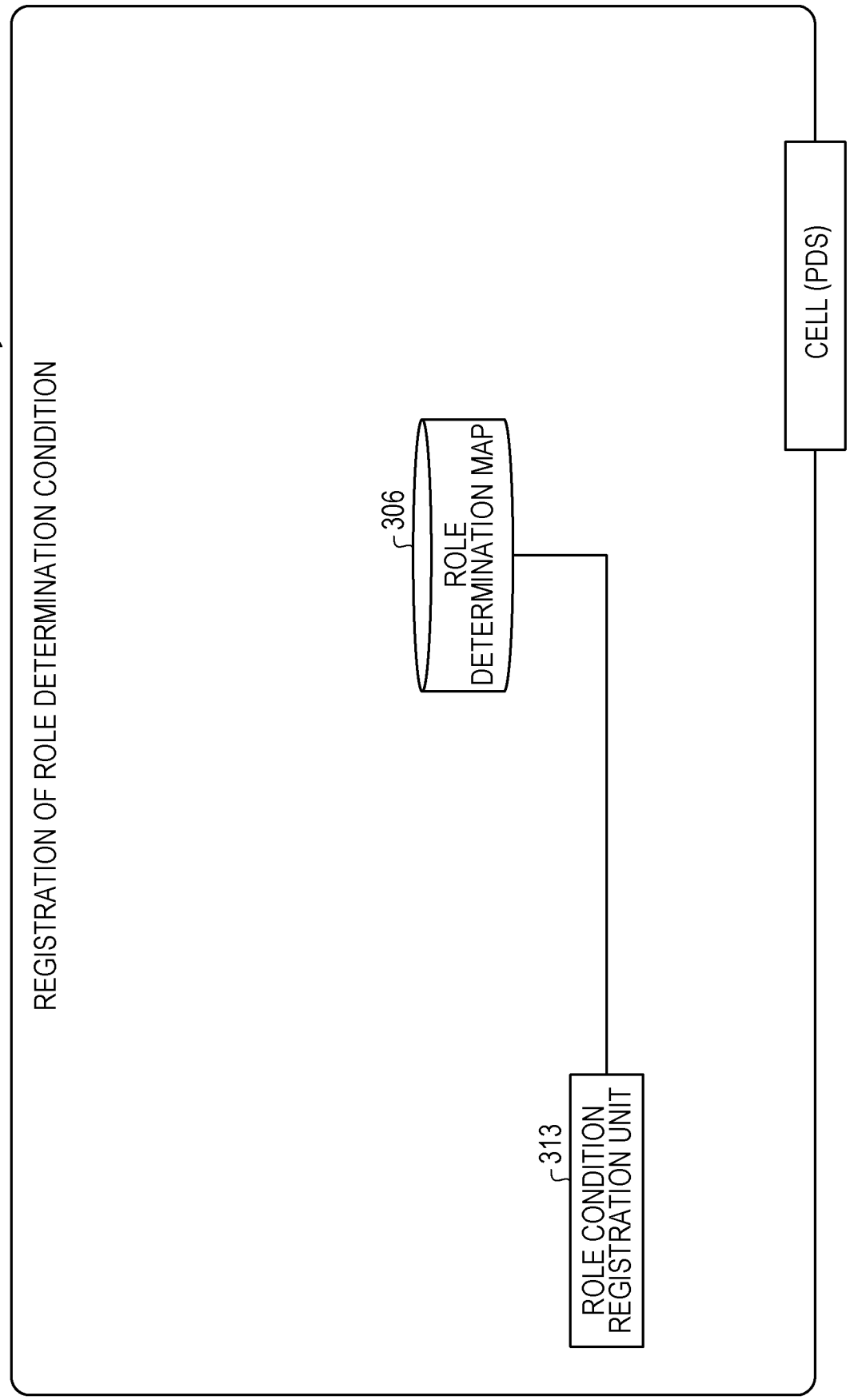
FIG. 13 is a block diagram illustrating an example of a functional configuration for registration of role determination conditions in the cells.

FIG. 13 is a block diagram illustrating an example of a functional configuration for registration of role determination conditions in the cells 101 and 151. In FIG. 13, the cells 101 and 151 use the role condition registration unit 313 and the like to register role determination conditions. For example, the role condition registration unit 313 presets determination conditions for automatically setting roles from the user terminal devices 110 and 160, and the like, and registers the determination conditions in the role determination map 306.

The role condition registration unit 313 may have its functions realized by the network I/F 203, the recording medium I/F 204, and the like illustrated in FIG. 2, for example.

Figure 14:
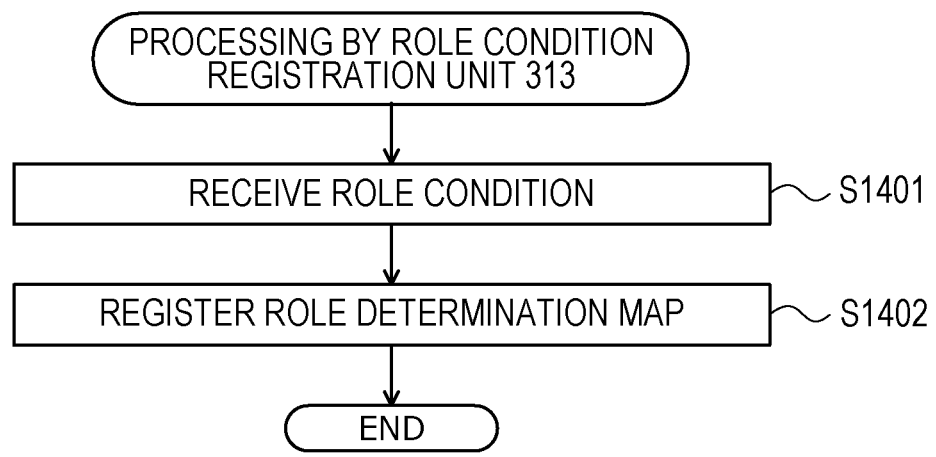
FIG. 14 is a flowchart illustrating an example of procedures performed by a role condition registration unit.

FIG. 14 is a flowchart illustrating an example of procedures performed by the role condition registration unit 313. In the flowchart of FIG. 14, the role condition registration unit 313 receives role conditions (Step S1401). The role conditions are received from the user terminal devices 110 and 160, and the like, for example. Alternatively, the role conditions may be received from another cell within the same distributed PDS server, another cell in another distributed PDS server, a user terminal device, or the like.

Then, the role condition registration unit 313 registers the received role condition ("role" and "relation condition" and "situation condition" associated with the role) in the role determination map 306 (Step S1402). Thus, the role condition registration unit 313 terminates a series of processing. In this way, the role condition registration unit 313 may register the "relation condition" and "situation condition", which are the role conditions, in the role determination map 306 that is the table for giving the role upon agreement with the rule.

Figure 15:
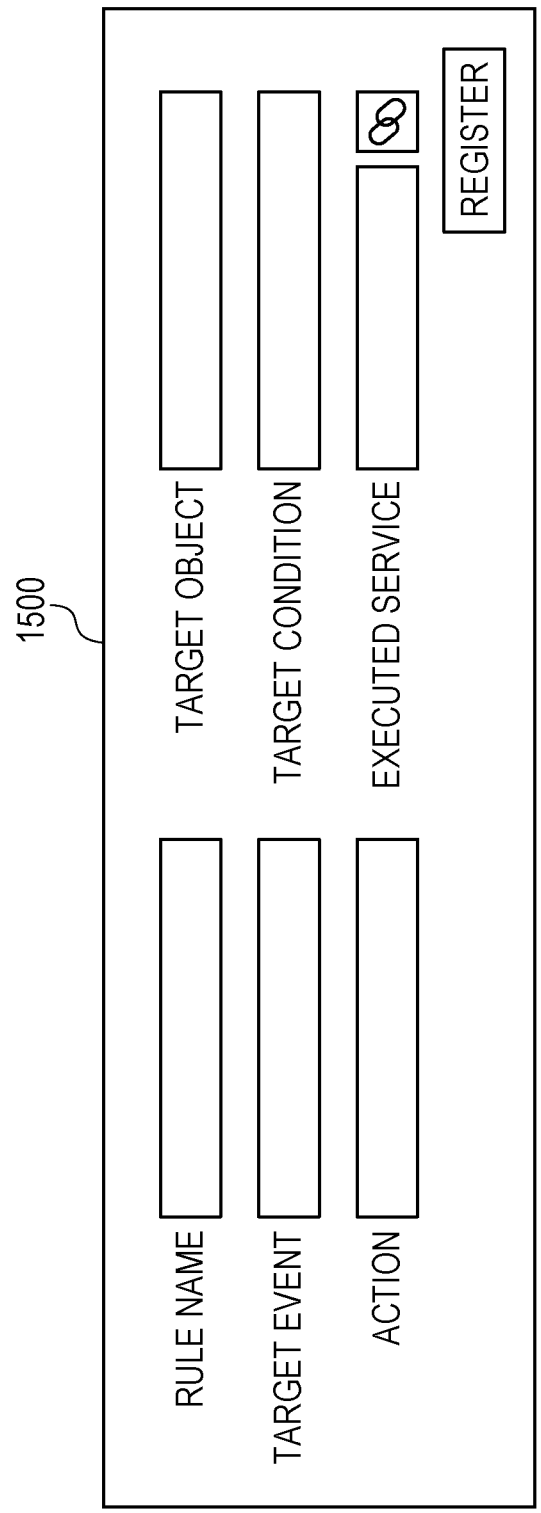
FIG. 15 is an explanatory diagram illustrating an example of a role condition setting screen.

FIG. 15 is an explanatory diagram illustrating an example of a role condition setting screen. A setting screen 1500 illustrated in FIG. 15 is displayed on the user terminal devices 110 and 160, for example. Then, predetermined information is entered in respective entry fields (for example, "rule name", "target object", "target event", "target condition", "action", "executed service", and the like), and then a register button is pressed. Accordingly, the role information may be transmitted from the user terminal devices 110 and 160 to the role condition registration unit 313.

A template that is likely to be used may be provided for settings. The history of settings may be reused as the template. Alternatively, only items written on the template may be prepared, and automatic settings may be performed with only one touch by the user.

(Setting Right)

Figure 16:
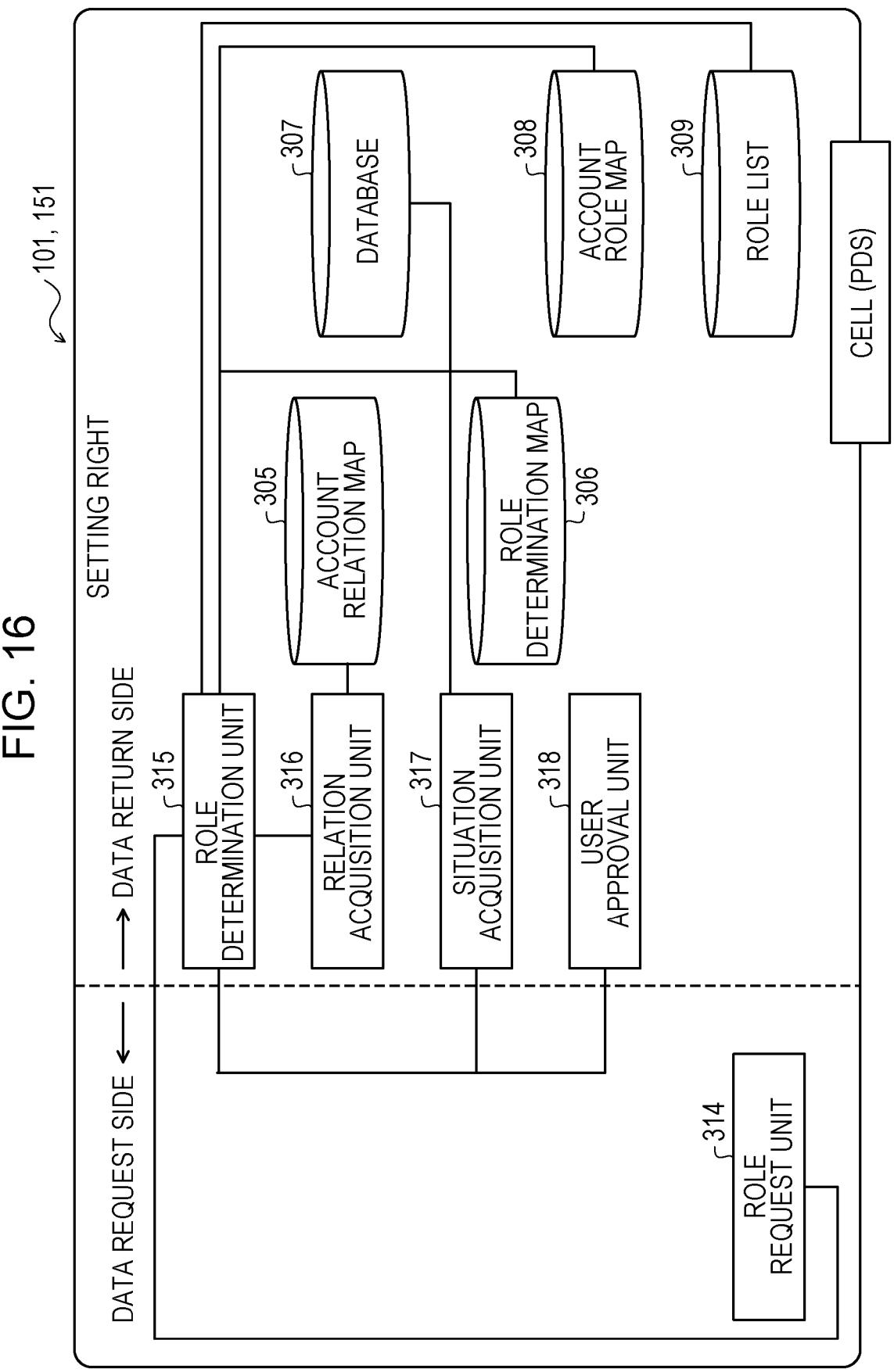
FIG. 16 is a block diagram illustrating an example of a functional configuration for setting rights in the cells.

FIG. 16 is a block diagram illustrating an example of a functional configuration for setting right in the cells 101 and 151. In FIG. 16, the data request side of the cells 101 and 151 uses the role request unit 314 for setting right. The data return side of the cells 101 and 151 uses the role determination unit 315, the relation acquisition unit 316, the situation acquisition unit 317, the user approval unit 318, and the like.

The role request unit 314 receives account information and role information, and transmits the account information and the role information to the role determination unit 315. It is assumed, here, that the role request unit 314 and the role determination unit 315 are different users (cells/data regions). The role request unit 314 may have its functions realized by the network I/F 203 and the like illustrated in FIG. 2, for example.

The role determination unit 315 receives the account information and role information transmitted from the role request unit 314 to determine appropriate role determination based on the relation and the situation. The role determination unit 315 may have its functions realized by the CPU 201, the network I/F 203, the recording medium I/F 205, and the like illustrated in FIG. 2, for example.

Upon request from the role determination unit 315, the relation acquisition unit 316 acquires information on a relation of a relevant account from the account relation map 305, and then transmits the acquired information to the role determination unit 315. The relation acquisition unit 316 may have its functions realized by the CPU 201, the recording medium I/F 204, and the like illustrated in FIG. 2, for example.

Upon request from the role determination unit 315, the situation acquisition unit 317 acquires information on a situation from the database 307, and then transmits the acquired information to the role determination unit 315. The situation acquisition unit 317 may have its functions realized by the CPU 201, the recording medium I/F 204, and the like illustrated in FIG. 2, for example.

Upon request from the role determination unit 315, the user approval unit 318 requests approval by a user through the user terminal device 110, for example, to determine the necessity of approval by the user (approved/not approved, or the like). Then, the user approval unit 318 transmits the determination result on the necessity of approval to the role determination unit 315. The user approval unit 318 may have its functions realized by the CPU 201 and the like illustrated in FIG. 2, for example.

Figure 17:
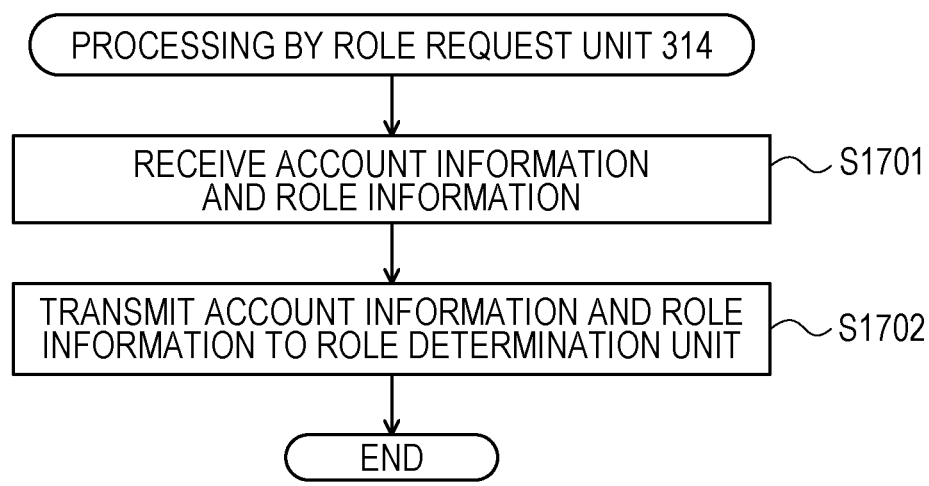
FIG. 17 is a flowchart illustrating an example of procedures performed by a role request unit.

FIG. 17 is a flowchart illustrating an example of procedures performed by the role request unit 314. In the flowchart of FIG. 17, the role request unit 314 receives account information and role information (Step S1701). The account information and the role information are received from the user terminal devices 110 and 160, and the like, for example. Alternatively, the role conditions may be received from another cell within the same distributed PDS server, another cell in another distributed PDS server, a user terminal device, or the like.

Next, the role request unit 314 transmits the account information and the role information to the role determination unit 315 (Step S1702). Thus, in order to request a role to access data (of mainly another user), the role request unit 314 calls up the role determination unit 315 (of another user) that determines whether or not to give a role. Accordingly, the role request unit 314 completes a series of processing.

In this way, the role request unit 314 may request the role request unit 314 in the cell of another user to perform role determination.

Figure 18:
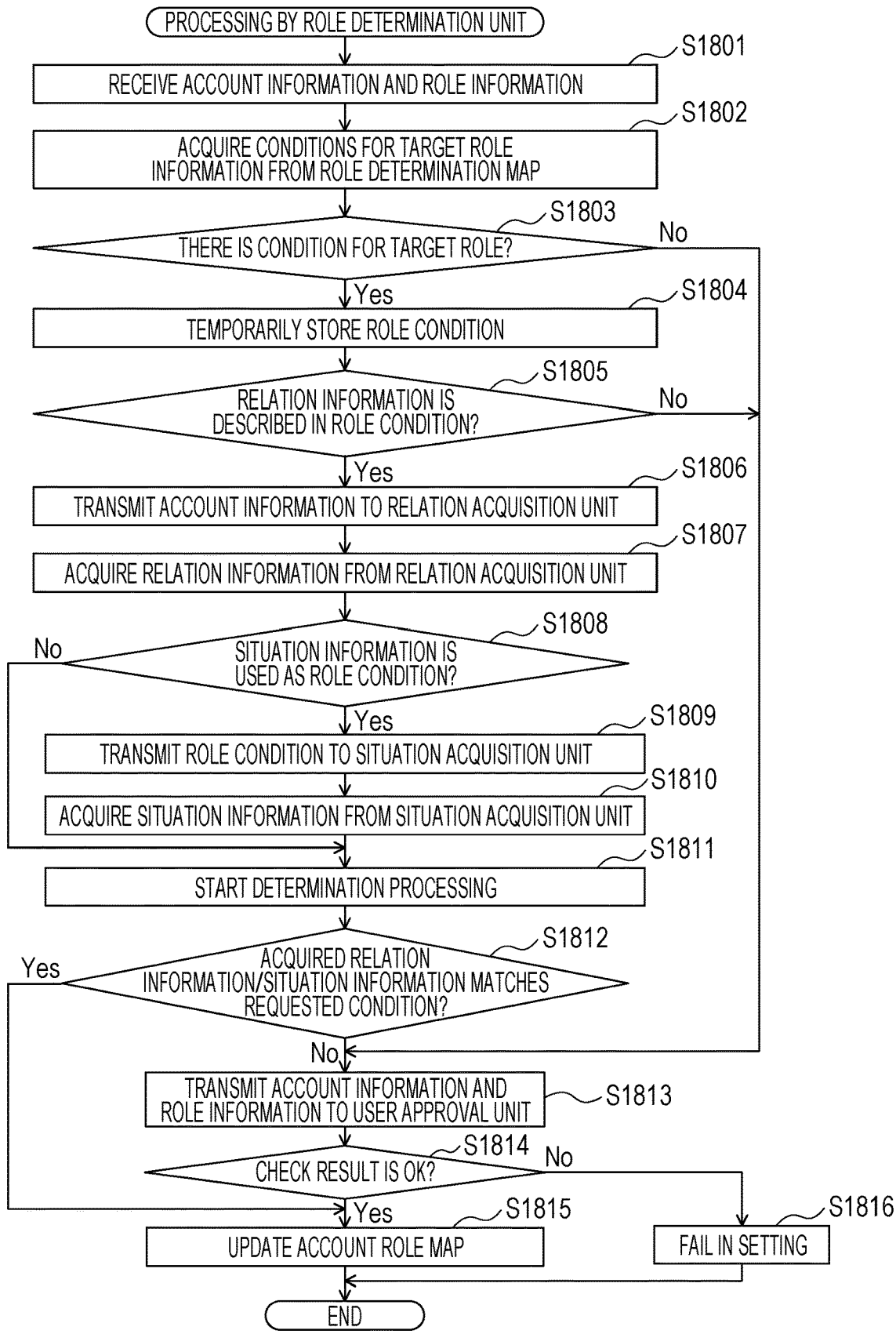
FIG. 18 is a flowchart illustrating an example of procedures performed by a role determination unit.

FIG. 18 is a flowchart illustrating an example of procedures performed by the role determination unit 315. In the flowchart of FIG. 18, the role determination unit 315 receives account information and role information from the role request unit 314 (Step S1801). Next, the role determination unit 315 acquires conditions for the target role information from the role determination map 306 (Step S1802). Then, the role determination unit 315 determines whether or not there are conditions for the target role (Step S1803). Here, when there are no conditions for the target role (Step S1803: No), the processing moves to Step S1813.

On the other hand, when there are conditions for the target role in Step S1803 (Step S1803: Yes), the role conditions are temporarily stored (Step S1804). Next, the role determination unit 315 determines whether or not relation information is described in the role conditions (Step S1805). Here, when no relation information is described in the role conditions (Step S1805: No), the processing moves to Step S1813.

On the other hand, when the relation information is described in the role conditions in Step S1805 (Step S1805: Yes), the account information is transmitted to the relation acquisition unit 316 (Step S1806) and the relation information is acquired from the relation acquisition unit 316 (Step S1807).

Thereafter, the role determination unit 315 determines whether or not to use the situation information as the role conditions (Step S1808). Here, when the situation information is not used as the role conditions (Step S1808: No), the processing moves to Step S1811.

On the other hand, when it is determined in Step S1808 that the situation information is used as the role conditions (Step S1808: Yes), the role conditions are transmitted to the situation acquisition unit 317 (Step S1809) and the situation information is acquired from the situation acquisition unit 317 (Step S1810). Subsequently, the processing moves to Step S1811 to start determination processing (Step S1811).

Then, it is determined whether or not the acquired relation information/situation information corresponds to the requested conditions (Step S1812). Here, when the acquired relation information/situation information corresponds to the requested conditions (Step S1812: Yes), the processing moves to Step S1815. On the other hand, when the acquired relation information/situation information does not correspond to the requested conditions (Step S1812: No), the account information and the role information are transmitted to the user approval unit 318 (Step S1813).

Thereafter, it is determined whether or not the check result is OK (S1814). Here, when the check result is not OK (Step S1814: No), it is determined that the setting has failed (Step S1816) and a series of processing is terminated. On the other hand, when it is determined in Step S1814 that the check result is OK (Step S1814: Yes), the account role map 308 is updated (Step S1815) and then a series of processing is terminated.

In this way, the role determination unit 315 may determine whether or not the requested account has right for a role requested by the role request unit 314.

Figure 19:
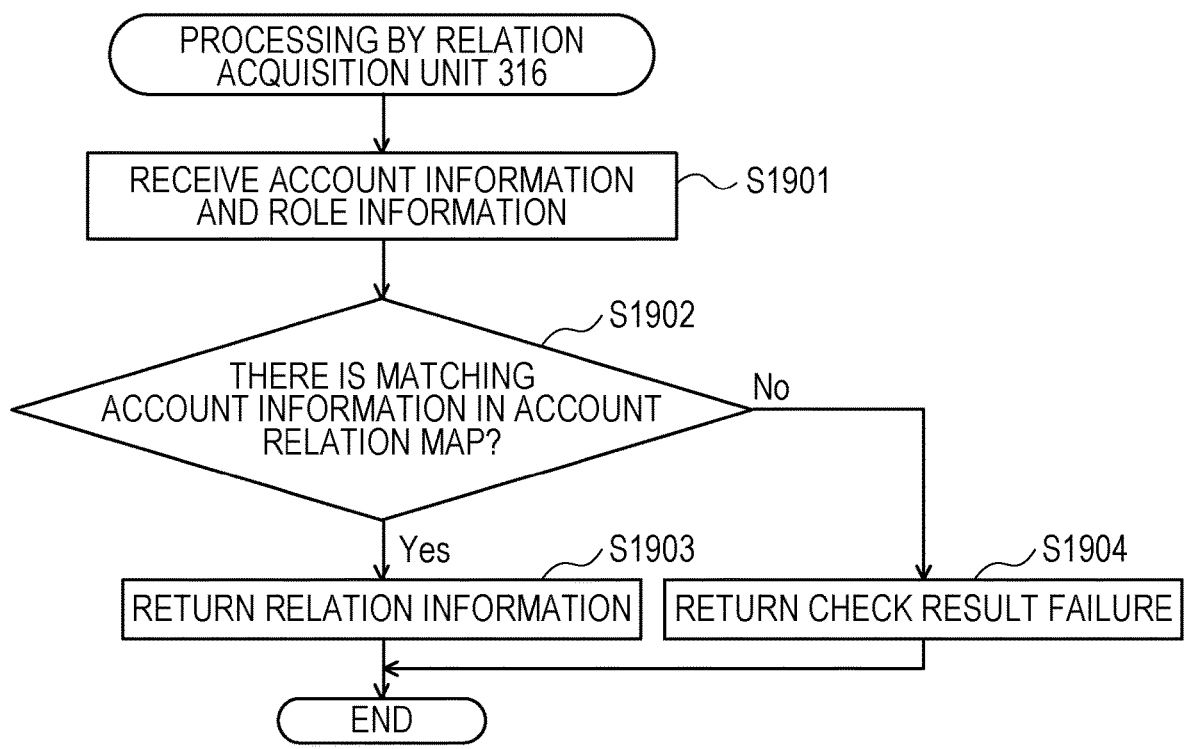
FIG. 19 is a flowchart illustrating an example of procedures performed by a relation acquisition unit.

FIG. 19 is a flowchart illustrating an example of procedures performed by the relation acquisition unit 316. In the flowchart of FIG. 19, the relation acquisition unit 316 acquires account information and role information (Step S1901). The account information and the role information are acquired from the role determination unit 315 (see Step S1806 in FIG. 18).

Then, it is determined whether or not there is account information that matches the account relation map 305 (Step S1902). Here, when there is matching account information (Step S1902: Yes), the relation information is returned to the role determination unit 315 (Step S1903) and then a series of processing is terminated. In this way, the role determination unit 315 acquires relation information from the relation acquisition unit 316 (see Step S1807 in FIG. 18).

When there is no matching account information in Step S1902 (Step S1902: No), notification that the check result is a failure is returned to the role determination unit 315 (Step S1904), and then a series of processing is terminated.

In this way, the relation acquisition unit 316 may acquire information on a relation of a relevant account upon request from the role determination unit 315, and transmit the acquired information to the role determination unit 315.

Figure 20:
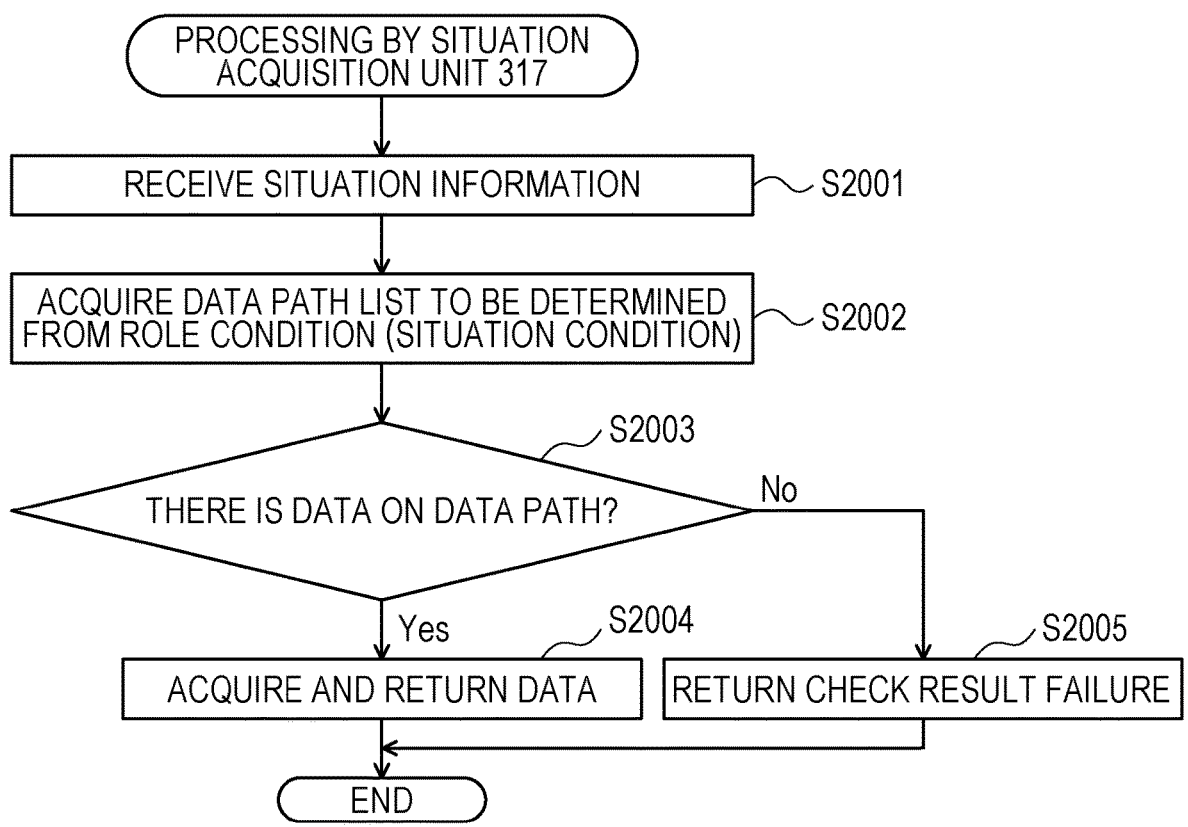
FIG. 20 is a flowchart illustrating an example of procedures performed by a situation acquisition unit.

FIG. 20 is a flowchart illustrating an example of procedures performed by the situation acquisition unit 317. In the flowchart of FIG. 20, the situation acquisition unit 317 receives situation information (Step S2001). The situation information is received from the role determination unit 315 (see Step S1809 in FIG. 18).

Next, a list of data paths to be determined is acquired from role condition (situation condition) (Step S2002). Then, it is determined whether or not there is data on a data path (Step S2003). Here, when there is data on the data path (Step S2003: Yes), the data is returned to the role determination unit 315 (Step S2004) and then a series of processing is terminated. Thus, the role determination unit 315 acquires data from the situation acquisition unit 317 (see Step S1810 in FIG. 18).

When it is determined in Step S2003 that there is no data on the data path (Step S2003: No), notification that the check result is a failure is returned to the role determination unit 315 (Step S2005), and then a series of processing is terminated.

In this way, the situation acquisition unit 317 may acquire information on a situation from the database 307 upon request from the role determination unit 315, and transmit the acquired information to the role determination unit 315.

Figure 21:
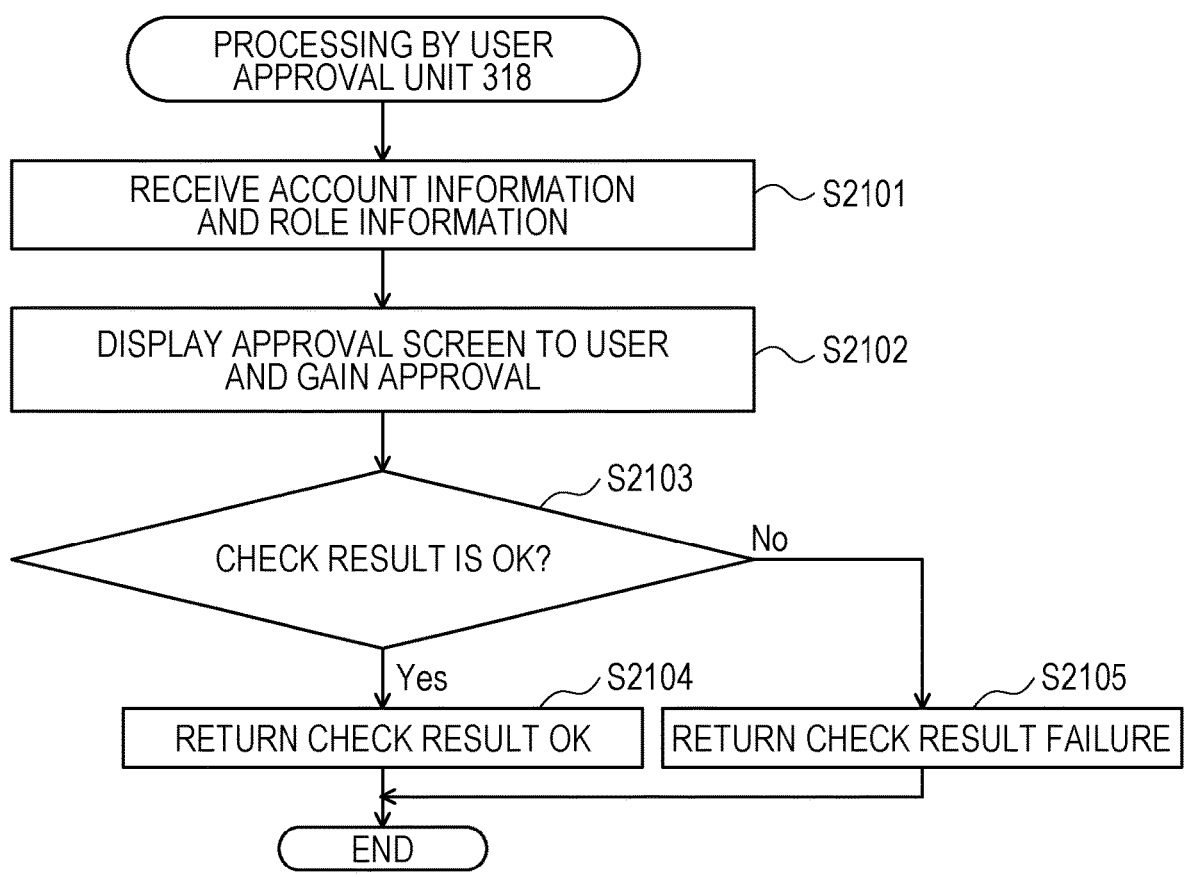
FIG. 21 is a flowchart illustrating an example of procedures performed by a user approval unit.

FIG. 21 is a flowchart illustrating an example of procedures performed by the user approval unit 318. In the flowchart of FIG. 21, the user approval unit 318 receives account information and role information (Step S2101). The account information and the role information are received from the role determination unit 315 (see Step S1813 in FIG. 18).

Next, an approval screen is displayed to the user to gain approval (Step S2102). Then, it is determined whether or not the check result is OK (Step S2103). Here, when the check result is OK (Step S2103: Yes), notification that the check result is OK is returned to the role determination unit 315 (Step S2104), and then a series of processing is terminated. In this way, the role determination unit 315 acquires the check result from the user approval unit 318 to make the determination (see Step S1814 in FIG. 18).

When it is determined in Step S2103 that the check result is not OK (Step S2103: No), notification that the check result is a failure is returned to the role determination unit 315 (Step S2105), and then a series of processing is terminated.

In this way, the user approval unit 318 may request user approval upon request from the role determination unit 315, acquire information on the necessity of the user approval, and then transmit the acquired information to the role determination unit 315.

(Access Control for Data Acquisition)

Figure 22:
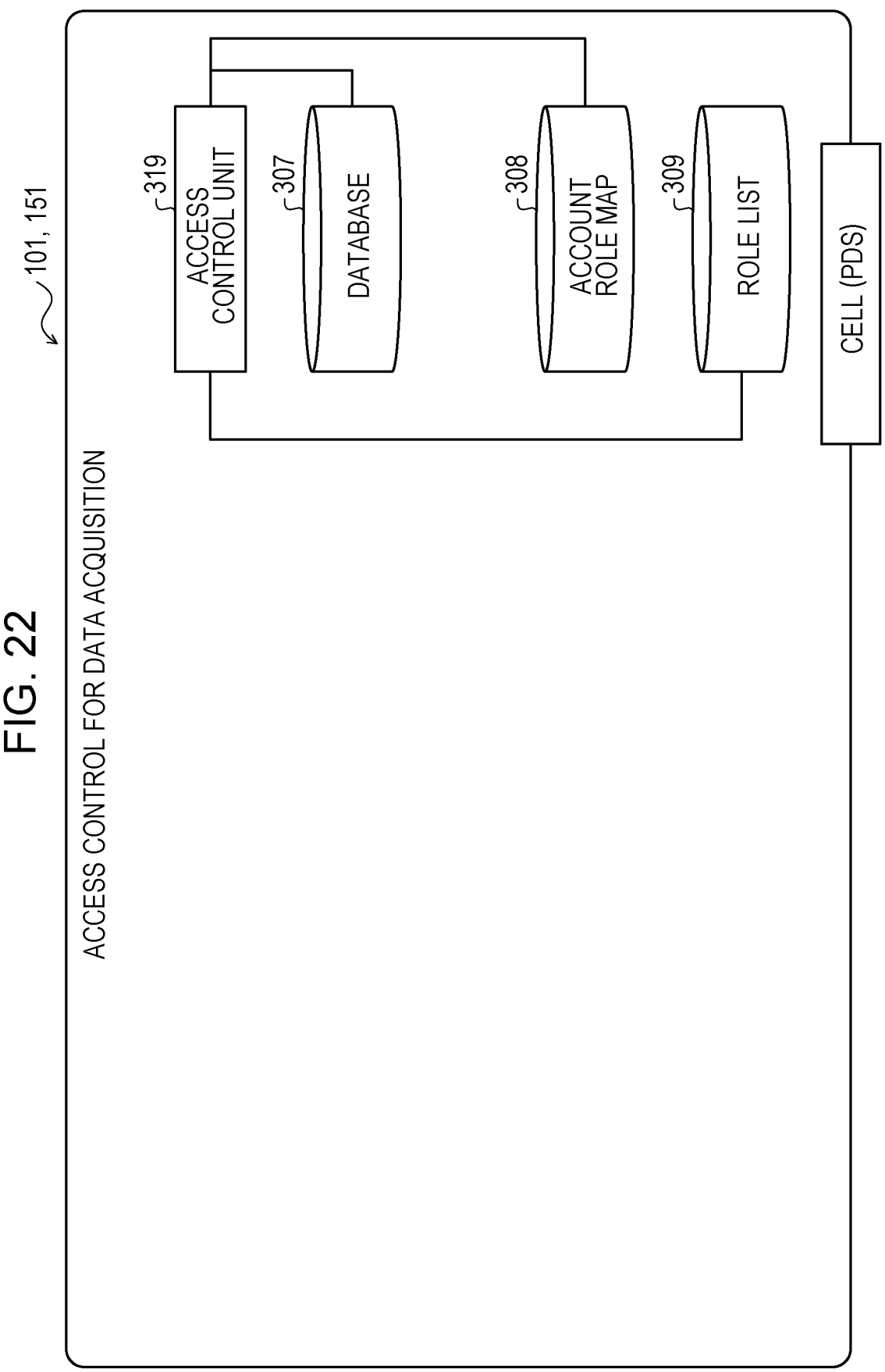
FIG. 22 is a block diagram illustrating an example of a functional configuration for access control for data acquisition in the cells.

FIG. 22 is a block diagram illustrating an example of a functional configuration for access control for data acquisition in the cells 101 and 151. In FIG. 22, the cells 101 and 151 use the access control unit 319 and the like for access control for data acquisition. That is, the access control unit 319 determines whether or not the data in the database 307 may be accessed in response to an access request from another cell, the user terminal devices 110 and 160, or the like, for example. The access control unit 319 may have its functions realized by the CPU 201, the network I/F 203, the recording medium I/F 204, and the like illustrated in FIG. 2, for example.

Figure 23:
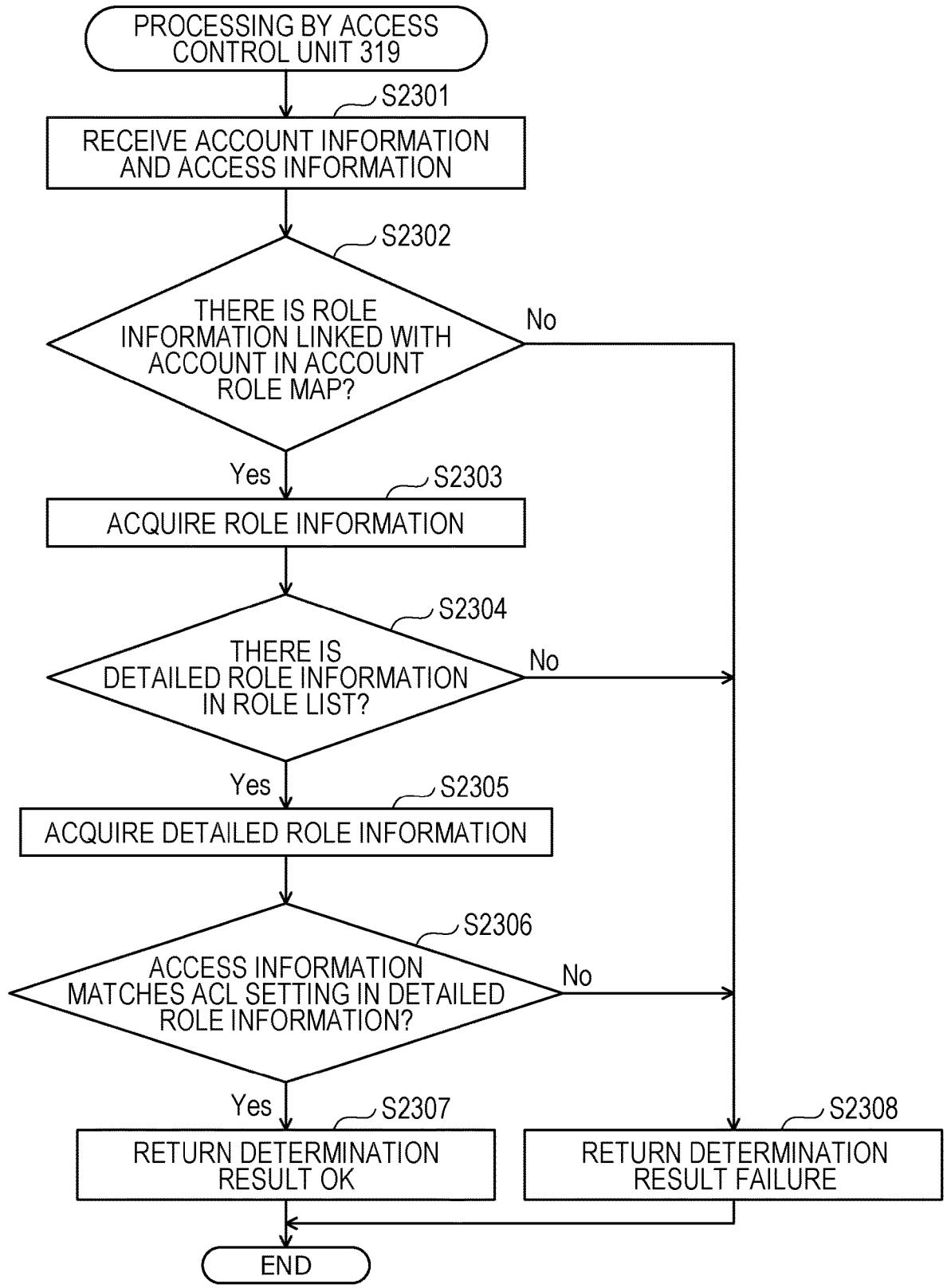
FIG. 23 is a flowchart illustrating an example of procedures performed by an access control unit.

FIG. 23 is a flowchart illustrating an example of procedures performed by the access control unit 319. In the flowchart of FIG. 23, account information and access information are received (Step S2301). The account information and the access information are received from another cell within the same distributed PDS server, another cell in another distributed PDS server, a user terminal device, or the like. Alternatively, the account information and the access information may be received from the user terminal devices 110 and 160 or the like.

Then, it is determined whether or not the account role map 308 includes role information linked with the account (Step S2302). Here, when there is no relevant role information (Step S2302: No), notification that the determination result is a failure is returned to the source (Step S2308), and then a series of processing is terminated. On the other hand, when it is determined in Step S2302 that there is relevant role information (Step S2302: Yes), the role information is acquired from the account role map 308 (Step S2303).

Next, it is determined whether or not the role list 309 includes detailed role information (Step S2304). Here, when there is no detailed role information (Step S2304: No), notification that the determination result is a failure is returned to the source (Step S2308), and then a series of processing is terminated. On the other hand, when it is determined in Step S2304 that there is detailed role information (Step S2304: Yes), the detailed role information is acquired from the role list 309 (Step S2305).

Thereafter, it is determined whether or not the access information matches access control list (ACL) settings in the detailed role information (Step S2306). Here, when the access information does not match the ACL settings in the detailed role information (Step S2306: No), notification that the determination result is a failure is returned to the source (Step S2308), and then a series of processing is terminated. On the other hand, when it is determined in Step S2306 that the access information matches the ACL settings in the detailed role information (Step S2306: Yes), notification that the determination result is OK is returned to the source (Step S2307), and then a series of processing is terminated.

Thus, when the determination result is OK, relevant data in the PDS may be accessed.

In this way, the access control unit 319 may determine whether or not the data in the database 307 may be accessed in response to an access request from another cell or the like.

As described above, according to this embodiment, in an event of access to user's personal data (for example, the PDS or the like) stored in a data region for each individual user, the right to access the user's personal data for the account may be controlled based on the relation with the user having the account to access the user's personal data and the situation in which the account accesses the user's personal data.

According to this embodiment, when the account satisfies the condition for the relation, the access right may be approved for the account. When the access by the account satisfies the condition for the situation, for example, when the access by the account satisfies the condition for the situation based on the user's personal data, the access right may be acknowledged for the account. The access right may also be acknowledged when user approval is gained.

According to this embodiment, the access right and the conditions for the relation and the situation for the access right are stored in association with each other, and the access right may be controlled based on the stored conditions.

According to this embodiment, a relation of an account with a user may be built up based on a predetermined rule, and whether or not the account satisfies the condition for the relation may be determined based on information on the built-up relation of the account with the user.

With such a configuration, according to this embodiment, the data access right may be dynamically set based on the relation and situation between the data holder and the user. Thus, the use of data may be dynamically permitted only to the user with an appropriate relation, when the preset conditions (for example, the condition for the relation and the condition for the situation) are satisfied, without the data holder giving approval point by point.

As for the data configuration and the relation rules, templates may be prepared. For example, as for a relation between an organizer and a participant for a meeting or a relation between a patient and a doctor for examination, the same relation is often built up from a general point of view, and thus a template may be predefined.

According to the right, not only the data disclosure range is changed but also the disclosed information may be filtered or processed into limited information. For example, information indicating a specific location of whereabouts (such as the latitude and longitude) may be obtained, or only limited information such as staying or not staying at home may be obtained.

EXAMPLES

Next, specific Examples 1 to 3 are described in detail. In Example 1, description is given of processing of providing home-staying/not-staying information to a home delivery agent. In Example 2, description is given of processing of providing medical information. In Example 3, description is given of processing of sharing meeting information by a superior and a subordinate.

In each example, for example, a role request by the role request unit 314 may be set as a "message" of a social function, and the role determination unit 315 may be implemented by "rules and determination scripts". Processing executed as an application is referred to as an "execution script". The message as one of the social functions is a mechanism to perform communication between cells, and a message "request a role" is possible.

Each of the rules is for processing a specific script upon change in data or transmission and reception of a message. The script may be an interpreter type executable program, which may be operated as a client of the PDS, such as PDS data acquisition and role setting. Those operated for role determination are referred to as the "determination script" and others are referred to as the "execution script".

Example 1: Processing of Providing the Home Delivery Agent with Home-Staying/not-Staying Information FIG. 24A is an explanatory diagram illustrating an example of data set for a user (deliverer) according to Example 1 (providing the home delivery agent with home-staying/not-staying information). In FIG. 24A, the following relation, role, script, and rule list are set, for example, for a PDS 2401 of the user "deliverer". For example, in the PDS 2401 of the "deliverer", a relation "customer" is set for a delivery customer A. In the PDS 2401 of the "deliverer", a role of giving "right to Write delivery information" is set for the delivery customer A. In the PDS 2401 of the "deliverer", a "notification script" is set, and a "rule for calling the notification script when the delivery information is changed" is set.

FIG. 24B is an explanatory diagram illustrating an example of data set for the user (delivery customer A) according to Example 1. In FIG. 24B, the following relation, role, script, and rule list are set for a PDS 2402 of the user "delivery customer A", as in the case of the "deliverer" illustrated in FIG. 24A. For example, in the PDS 2402 of the "delivery customer A", a relation "home delivery agent" is set for the deliverer. In the PDS 2402 of the "delivery customer A", a role of giving "right to Read (acquire) home-staying information" and "right to Read homecoming status" is set for the deliverer. In the PDS 2402 of the "delivery customer A", a "home-staying check script", a "homecoming status check script", and an "automatic approval script" are set, and a "rule for regularly executing the home-staying check or homecoming status check script" is set.

FIGS. 25A to 25E are explanatory diagrams (Part 1 to Part 5) each illustrating an example of processing according to Example 1 (providing the home delivery agent with home-staying/not-staying information).

FIG. 25A illustrates the premise when the home-staying/not-staying information is provided to the home delivery agent. In FIG. 25A, information of the delivery customer A is registered with a PDS 2501 of the deliverer of the home delivery agent upon installation of an application of the home delivery agent or upon delivery request. At the same time, a relation is set and the right to Write relevant home delivery information is also given (Step S2511). Then, a notification script is deployed as an execution script to be processed (Step S2512).

Meanwhile, a relation with the home delivery agent is preset in a PDS 2502 of the delivery customer A upon installation of the application of the home delivery agent (Step S2513). For example, relation information is linked with the account. As roles to be set, the right to Read the home-staying status and the right to Read the homecoming status are automatically deployed (Step S2514). As scripts to be processed, the home-staying check script, the homecoming status check script, and a determination script for automatically approving a message from an account having a relation defined are deployed (Step S2515). As an activation rule, a rule for regularly moving the home-staying check or homecoming status check script is deployed (Step S2516).

Figure 25B:
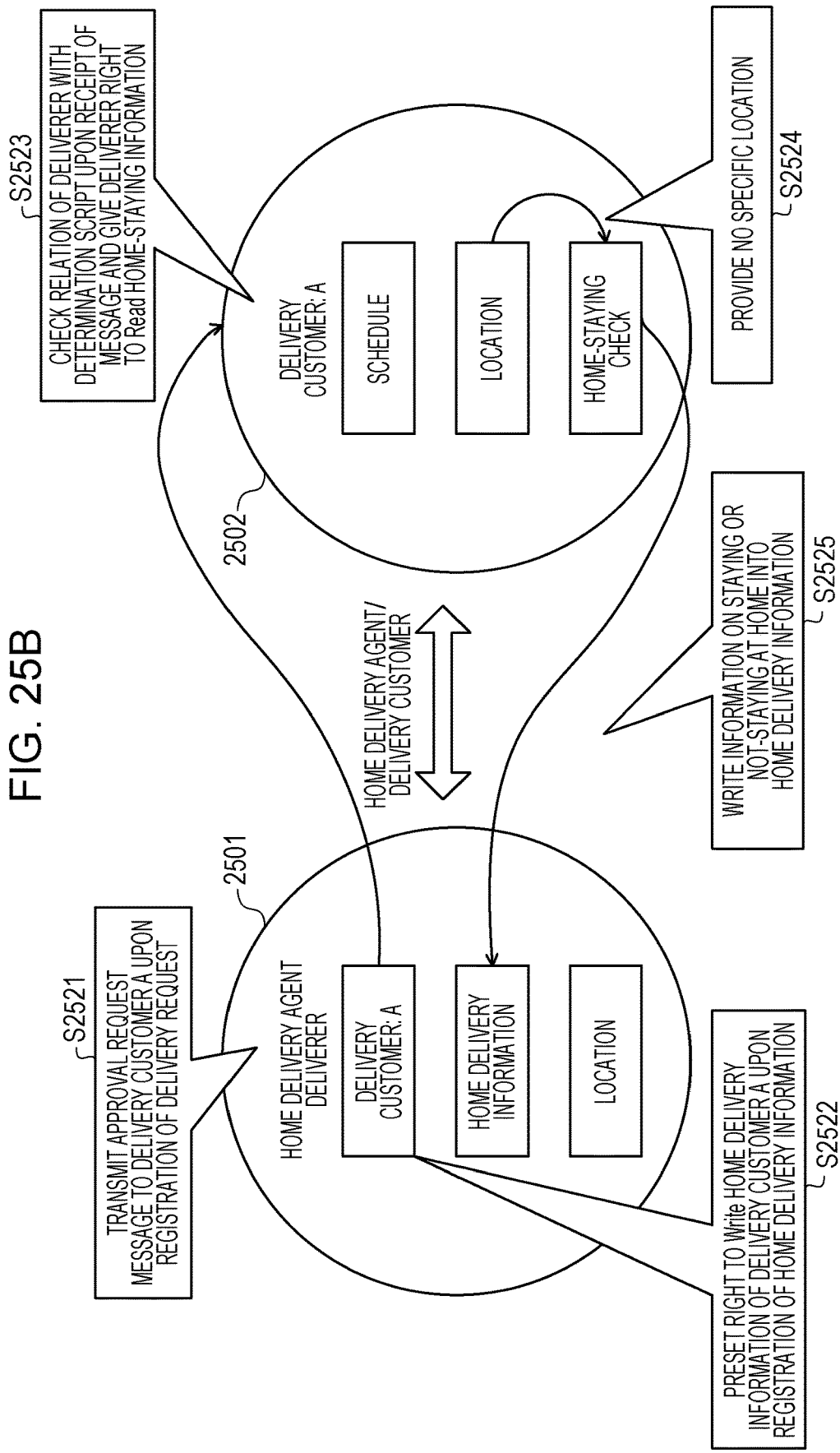

FIG. 25B illustrates basic operations when the home-staying/not-staying information is provided to the home delivery agent. In FIG. 25B, the PDS 2501 of the deliverer of the home delivery agent transmits a message requesting approval from the delivery customer A to the PDS 2502 of the delivery customer A upon registration of the delivery request (Step S2521). The right to Write home delivery information of the delivery customer A is preset upon registration of the home delivery information (Step S2522).

Meanwhile, the PDS 2502 of the delivery customer A uses the determination script to check the relation of the deliverer upon receipt of the approval request message, and gives the deliverer the right to Read the home-staying information (Step S2523). The PDS 2502 of the delivery customer A does not provide any specific location (Step S2524). Then, information indicating staying or not staying at home is written into the home delivery information in the PDS 2501 of the deliverer of the home delivery agent (Step S2525).

FIG. 25C illustrates notification processing upon change in staying/not-staying in the processing of providing the home delivery agent with the home-staying/not-staying information. In FIG. 25C, the PDS 2501 of the deliverer of the home delivery agent pre-registers a terminal (a smartphone 2530 of the deliverer) to receive notification (Step S2531). Then, when the home delivery information is written, a script for notifying the terminal upon change in staying/not-staying is executed (Step S2532). Thus, any change in staying/not-staying is notified in real time to the smartphone 2530 of the deliverer (Step S2533).

Figure 25D:
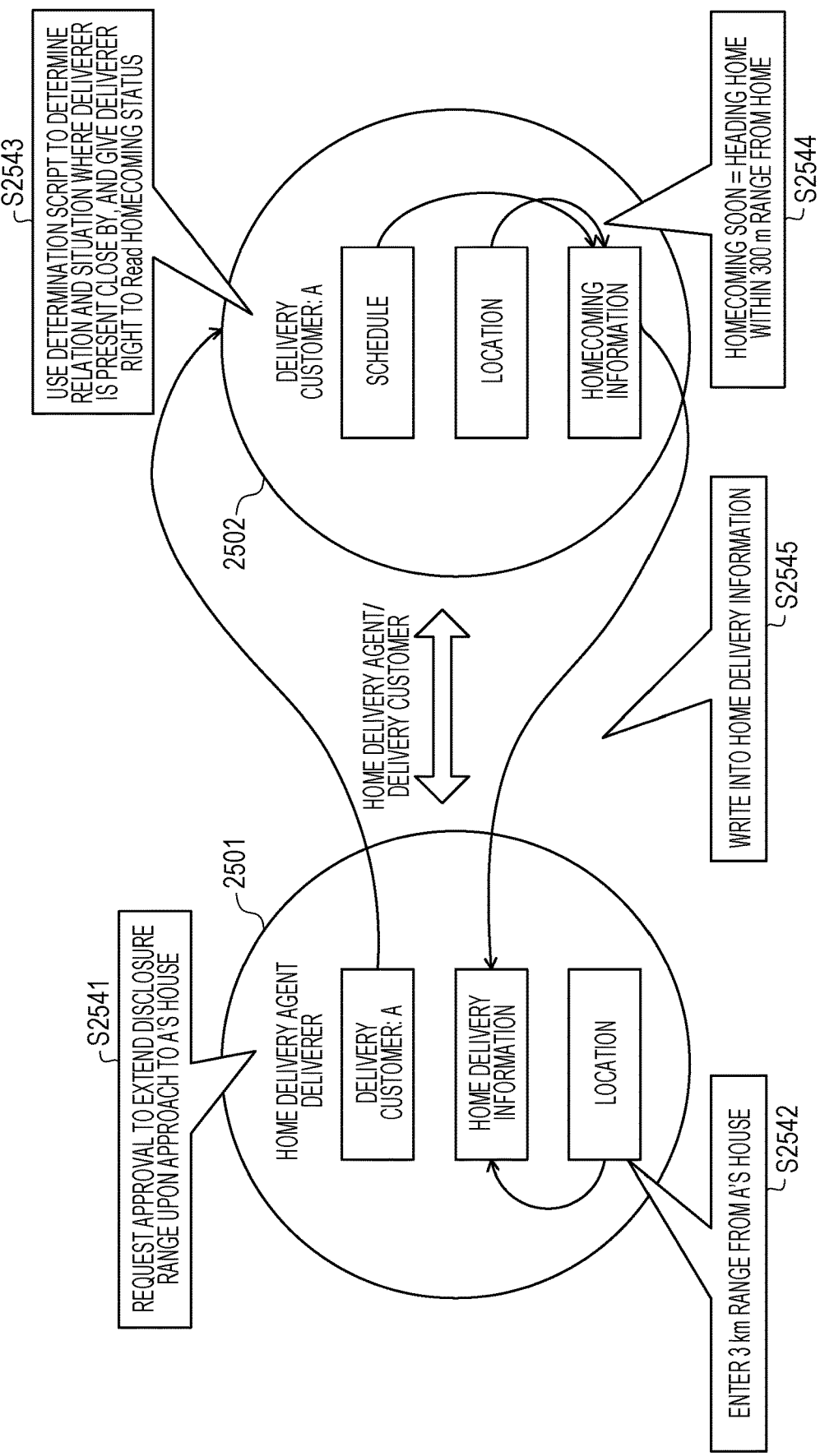

FIG. 25D illustrates dynamic information disclosure in the processing of providing the home delivery agent with the home-staying/not-staying information. In FIG. 25D, the PDS 2501 of the deliverer of the home delivery agent requests the PDS 2502 of the delivery customer A for approval to extend the disclosure range when approaching the house of the delivery customer A (Step S2541). Then, the fact that the deliverer enters a 3 km range from the house of the delivery customer A is registered in the home delivery information (Step S2542).

Meanwhile, the PDS 2502 of the delivery customer A uses the determination script to determine a situation where the deliverer is present close by, in addition to the relation, and gives the right to Read the homecoming status to the PDS 2501 of the deliverer of the home delivery agent (Step S2543). Next, homecoming soon=heading home within 300 m range from home is registered in homecoming information (Step S2544). Thereafter, the homecoming information is written into the home delivery information in the PDS 2501 of the deliverer of the home delivery agent (Step S2545).

FIG. 25E illustrates processing of deleting information in the processing of providing the home delivery agent with the home-staying/not-staying information. In FIG. 25E, the PDS 2501 of the deliverer of the home delivery agent transmits a role deletion request message to the PDS 2502 of the delivery customer A upon completion of delivery (Step S2551).

Meanwhile, the PDS 2502 of the delivery customer A deletes all Read right of the home delivery agent by automatic approval upon receipt of the role deletion request message (Step S2552). Thus, the PDS 2501 of the deliverer of the home delivery agent may no longer view the information of the delivery customer A (Step S2553).

As described above, in Example 1, the home-staying status of the delivery customer A may be checked on a delivery date. When conditions such as a delivery time, approaching to the house of the delivery customer A, and the not-staying (the delivery customer A is close by) are satisfied concurrently, the homecoming status may be checked to see whether the delivery customer A will come home soon. Thus, the deliverer of the home delivery agent may determine whether or not to make a delivery, based on such information, without actually making a delivery to the customer.

Example 2: Processing of Providing Medical Information

FIG. 26A is an explanatory diagram illustrating an example of data set for a user (doctor) according to Example 2 (providing medical information). In FIG. 26A, the following relation and role are set, for example, for a PDS 2601 of a "doctor" that is a user. For example, in the PDS 2601 of the "doctor", a relation "patient" is set for a patient A.

In the PDS 2601 of the "doctor", a role of giving the "right to Write appointment information" is set for the patient A. In FIG. 26A, no script nor rule list is set in the PDS 2601 of the "doctor".

FIG. 26B is an explanatory diagram illustrating an example of data set for a user (patient A/emergency patient) according to Example 2. In FIG. 26B, a relation, roles, a script, and a rule list are also set for a PDS 2602 of a "patient A/emergency patient" that is a user, as in the case of Example 1. For example, in the PDS 2602 of the "patient A/emergency patient", a relation "doctor in charge" is set for the doctor.

In the PDS 2602 of the "patient A/emergency patient", a role of giving the "right to Read personal information" to the doctor and a role of giving the "right to Read personal information" to a third party (in case of emergency) are set. In the PDS 2602 of the "patient A/emergency patient", a "determination script" is set, and an "automatic approval rule upon receipt of a message" is set.

FIGS. 27A and 27B are explanatory diagrams each illustrating an example of processing according to Example 2 (providing medical information). FIG. 27A illustrates processing of providing medical information in a normal situation. In FIG. 27A, a PDS 2702 of the patient A first prepares a determination script to allow the doctor to disclose data. Then, a determination script for automatic approval is set to be started (executed) upon receipt of a message. Next, the patient makes an appointment for examination or applies for examination at reception.

Meanwhile, a PDS 2701 of the doctor approves the appointment for examination or the application for examination from the patient. Thus, the relation between the patient and the doctor ("doctor: doctor in charge") is automatically built up (Step S2711). Then, the PDS 2701 of the doctor transmits a right acquisition request message to view the medical history or lifestyle of the patient during examination (Step S2712).

On the other hand, the PDS 2702 of the patient A starts the determination script for automatic approval upon receipt of the right acquisition request message to determine the relation (patient and doctor) built up in Step S2712, thereby associating with the doctor (Step S2713). Thereafter, the right to Read (acquire) the personal information is given to the PDS 2701 of the doctor (Step S2714). Thus, the PDS 2701 of the doctor has personal information acquisition right set automatically therein to enable access to the personal information to be used for examination. Upon completion of the examination, the right given to the doctor and the relation (patient and doctor) are discarded.

FIG. 27B illustrates processing of providing medical information in case of emergency. In FIG. 27B, a PDS 2703 of the third party builds up a relation by acquiring a specific QR code (registered trademark), for example, from an information terminal device 150 of an emergency patient, or the like (Step S2721). Then, the PDS 2703 of the third party immediately transmits a message requesting approval for information disclosure to a PDS 2704 of the emergency patient (Step S2722).

On the other hand, in the PDS 2704 of the emergency patient, the relation is not limited to "doctor: doctor in charge" when healthcare information does not illustrate a normal value=in case of emergency such as a collapse. Upon agreement with data obtained from the specific QR code, a role regarding the right to Read the personal information is permitted by automatic approval (Step S2723). Then, an emergency message gives the right to Read the personal information to a rescuer on the spot, regardless of the relation (Step S2724). The PDS 2702 of the third party has personal information acquisition right set automatically therein to enable access to the personal information to be used for examination.

In this way, in case of emergency such as a sudden collapse, all the personal information may be disclosed through acquisition of a specific QR code or the like.

Example 3: Sharing Meeting Schedule Information by Superior and Subordinate

FIG. 28A is an explanatory diagram illustrating an example of data set for a user (superior) according to Example 3 (sharing meeting schedule information by a superior and a subordinate). In FIG. 28A, the following relation, rules, scripts, and a rule list are set, for example, for a PDS 2801 of a "superior" that is a user. For example, in the PDS 2801 of the "superior", a relation "colleague/subordinate" is set for a subordinate A. In the PDS 2801 of the "superior", a role of giving the "right to Read a schedule" is set for the subordinate A.

In the PDS 2801 of the "superior", a "schedule write script", a "determination script", and a "10-minute-to-go notification script" are set. Also, rules are set, such as a "(rule of) writing a schedule of a member (subordinate) when the schedule is added", a "(rule of) notifying a change in schedule", a "(rule of) automatic approval upon receipt of a message from an account having a relation defined", and a "(rule of) notifying 10 minutes before start".

FIG. 28B is an explanatory diagram illustrating an example of data set for the user (subordinate A) according to Example 3. In FIG. 28B, in a PDS 2802 of the user "subordinate A", a relation "colleague/organizer" is set for the superior. In the PDS 2802 of the "subordinate A", a role of giving the superior the "right to Read/Write a schedule", "right to Read the location", and "right to Read the material" is set. In the PDS 2802 of the "subordinate A", a "notification script" and a "determination script" are set, and a "rule of updating schedule information of the superior when the material is updated" is set.

Figure 29A:
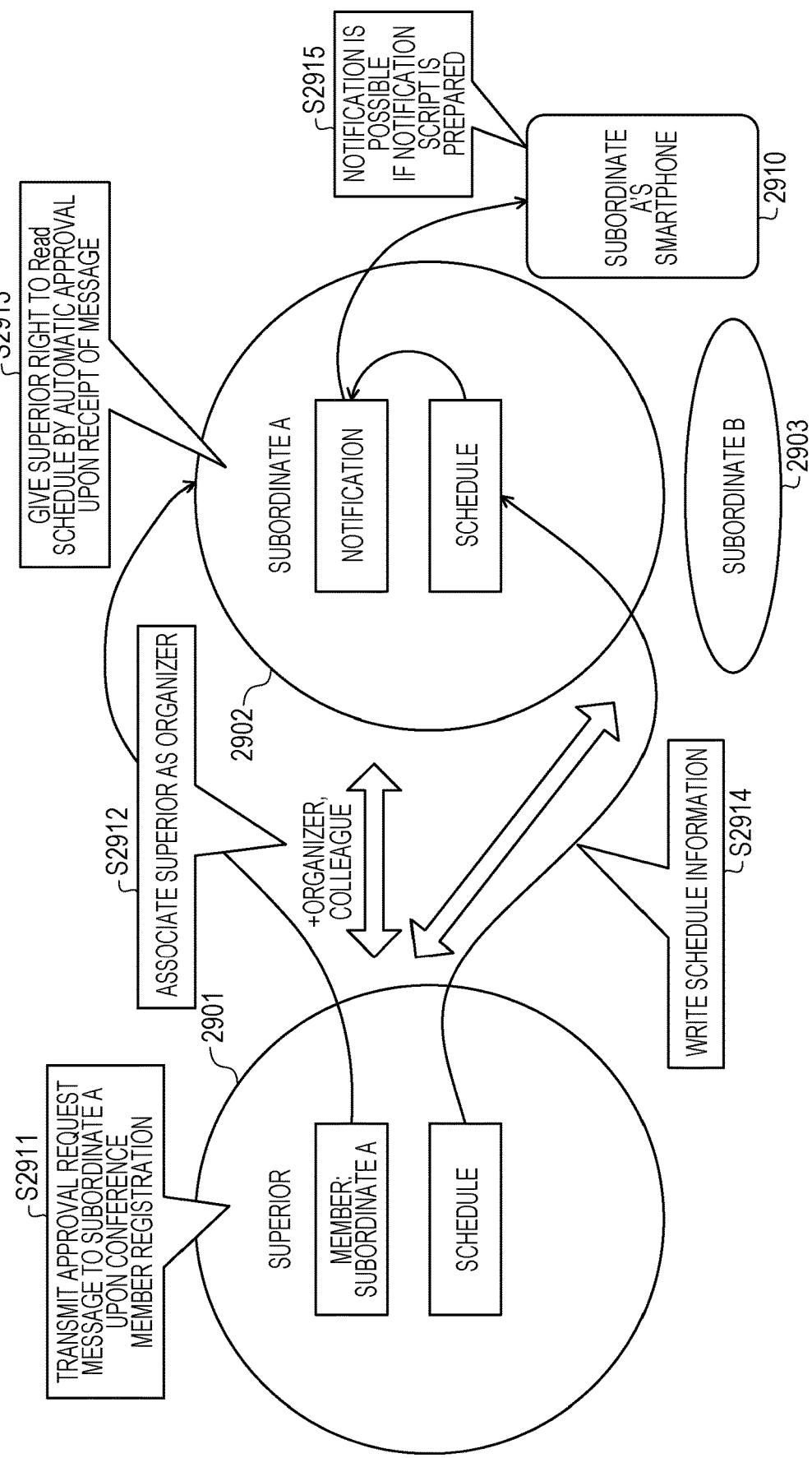

FIGS. 29A to 29D are explanatory diagrams each illustrating an example of processing according to Example 3 (sharing the meeting schedule information by the superior and the subordinate). In FIG. 29A, a PDS 2901 of the superior and a PDS 2902 of the subordinate A have a predetermined relation "colleague employee". The PDS 2901 of the superior transmits an approval request message to the subordinate A upon registration of a meeting member (Step S2911). For example, the PDS 2901 of the superior transmits a message requesting the member of the scheduled meeting for the right to Read and Write schedule information when writing his/her own meeting schedule, and registers rules and scripts for writing the same meeting information.

Meanwhile, the PDS 2902 of the subordinate A prepares a determination script to give the colleague employee the right to Read the meeting schedule information. Then, a rule is registered for starting the determination script for automatic approval upon receipt of a message. Then, the superior is associated as an organizer (Step S2912).

Next, the PDS 2901 of the superior transmits a right request message to the subordinate A, according to rules, by writing the schedule while including the subordinate A in the members. The subordinate A automatically approves the right request message, and gives the superior the right to Read the meeting schedule information (Step S2913). The PDS 2901 of the superior subsequently writes the meeting schedule information into the schedule information of the subordinate A (Step S2914). Such information may also be notified to a smartphone 2910 of the subordinate A by preparing a notification script.

Thus, when a meeting is set for specified members, the meeting is notified to the members and a script to synchronize the meeting is operated. Accordingly, the schedule information of the superior and the subordinate A is shared. The same settings as those for the PDS 2902 of the subordinate A may be configured for a PDS 2903 of a subordinate B.

In FIG. 29B, the PDS 2902 of the subordinate A requests the PDS 2901 of the superior to register a rule for notifying a change in schedule (Step S2921). On the other hand, the PDS 2901 of the superior registers the rule by automatic approval with a determination script upon receipt of a message (Step S2922). Then, any change in meeting schedule is notified to the PDS 2902 of the subordinate A (Step S2923).

Thus, the superior side is requested to set the rule for notifying a change in meeting. This may ensure information sharing even in the event of a dynamic change in situation. The same settings as those for the PDS 2902 of the subordinate A may be configured for the PDS 2903 of the subordinate B.

Figure 29C:
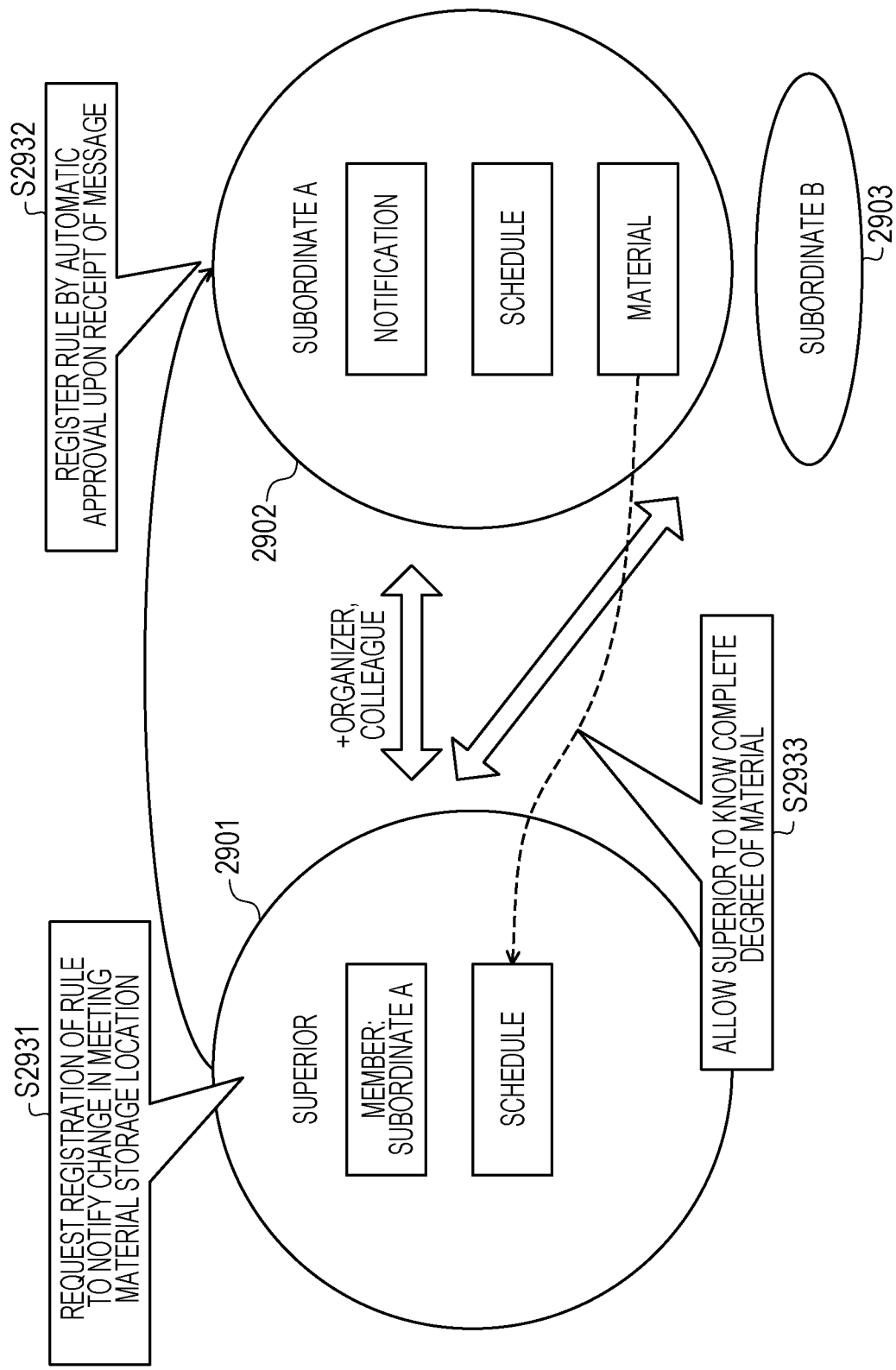

In FIG. 29C, the PDS 2901 of the superior requests the PDS 2902 of the subordinate A to register a rule for notifying a change in meeting material storage area (Step S2931). In response, the PDS 2902 of the subordinate A registers the rule by automatic approval upon receipt of a message (Step S2932). Thus, the PDS 2901 of the superior may keep track of the completion of the meeting material of the subordinate A (Step S2933).

In this way, the superior side may request the member side to set the rule for notifying a change in meeting material storage area or the like for the member. The same settings as those for the PDS 2902 of the subordinate A may be configured for the PDS 2903 of the subordinate B.

In FIG. 29D, the PDS 2901 of the superior notifies the member (including the PDS 2902 of the subordinate A) of 10 minutes before the meeting (Step S2941). Upon receipt of the notification of 10 minutes before the meeting, the PDS 2902 of the subordinate A discloses location information to the superior (Step S2942).

Thus, by notifying the member of 10 minutes before the meeting, more detailed information about the location of the member may be provided from 10 minutes before the meeting. The same settings as those for the PDS 2902 of the subordinate A may be configured for the PDS 2903 of the subordinate B.

Figure 30B:
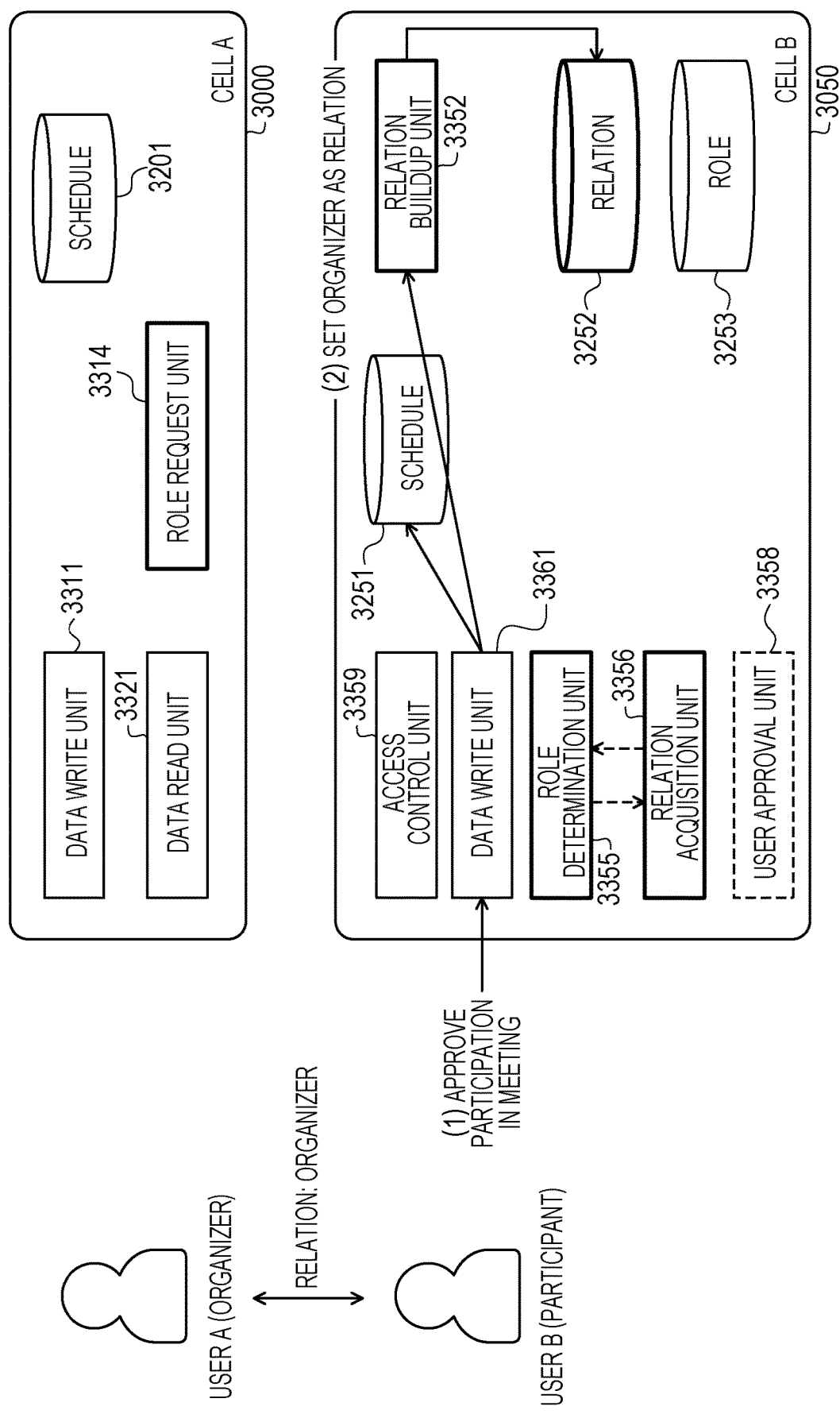

FIGS. 30A to 30D are explanatory diagrams each illustrating an example of the processing according to Example 3 using the functional configurations of the cells. FIG. 30A illustrates a flow up to writing a schedule. In FIG. 30A, a cell A 3000 is a PDS of a user A (organizer) and a cell B 3050 is a PDS of a user B (participant). As for the user A (organizer), a relation "colleague employee" is built up with the user B (participant).

(1) The user A (organizer) writes a meeting schedule into a data write unit 3311 in the cell A 3000. The meeting schedule written into the data write unit 3311 is stored in a schedule (database) 3201 and is also transmitted to a role request unit 3314.

(2) The role request unit 3314 transmits account information and role information of the user A (organizer) to a role determination unit 3355 in the cell B 3050, and requests the right to Read and Write a schedule (schedule R/W right). The role determination unit 3355 transmits a relation acquisition request to the relation acquisition unit 3356. Upon receipt of the relation acquisition request, the relation acquisition unit 3356 determines whether or not a relation (database (account relation map)) 3252 includes a relation matching with the account information.

(3) Since it is found out that the account relation map (relation) 3252 includes the relation matching with the account information, that is, the account of the user A (organizer) has the relation "colleague employee", the relation acquisition unit 3356 notifies the role determination unit 3355 of that effect.

(4) The role determination unit 3355 confirms that the schedule R/W right may be given to the colleague employee, and gives the right to the user A. For example, a role (database (account role map)) 3253 is updated to link the account (user A) and the role (schedule R/W right).

(5) When the data write unit 3311 in the cell A 3000 tries to write the same schedule as the written meeting schedule into the user B, an access control unit 3359 in the cell B 3050 determines whether or not to permit the access (write). The access control unit 3359 accesses and checks the role (database (account role map and role list)) 3253.

(6) As a result of checking the role 3253, it is found out that the user A has the schedule R/W right, the access control unit 3359 permits the write and stores the meeting schedule written from the user A in a schedule (database) 3251 in the cell B 3050.

FIG. 30B illustrates updating the relation. In FIG. 30B, again, a cell A 3000 is a PDS of a user A (organizer) and a cell B 3050 is a PDS of a user B (participant) as in the case of FIG. 30A. As for the user A (organizer), a relation "organizer" is built up with the user B (participant).

(1) The user B (participant) writes information indicating the approval for participation in a meeting into a data write unit 3361 in the cell B 3050 that is the own cell. The information indicating the approval for participation in the meeting written into the data write unit 3361 is stored in a schedule (database) 3251 and is also transmitted to a relation buildup unit 3352.

(2) As for the relation, the relation buildup unit 3352 sets the user A (organizer) as the "organizer" and stores the relation in a relation (database) 3252. Thus, the relation (database) 3252 in the cell B 3050 may be updated.

FIG. 30C illustrates sharing a meeting material. In FIG. 30C, again, a cell A 3000 is a PDS of a user A (organizer) and a cell B 3050 is a PDS of a user B (participant) as in the case of FIGS. 30A and 30B. As for the user A (organizer), a relation "organizer" is built up with the user B (participant).

(1) According to an instruction of the user A (organizer), a role request unit 3314 in the cell A 3000 requests a role determination unit 3355 in the cell B 3050 for the right to Read the meeting material.

(2) The role request unit 3314 transmits account information and role information of the user A (organizer) to the role determination unit 3355 in the cell B 3050, and requests the right to Read the meeting material. The role determination unit 3355 transmits a relation acquisition request to the relation acquisition unit 3356. Upon receipt of the relation acquisition request, the relation acquisition unit 3356 determines whether or not a relation (database (account relation map)) 3252 includes a relation matching with account information, and notifies the role determination unit 3355 to the effect that the user A (organizer) has the relation "organizer". Upon receipt of the notification, the role determination unit 3355 gives the user A (organizer) the right to Read the meeting material, and updates the role (database (account role map)) 3253 to link the account (user A) and the role (right to Read the meeting material).

(3) Next, when the user A (organizer) requests a data read unit 3321 in the cell A 3000 to acquire (read) the meeting material of the user B (participant), the data read unit 3321 requests an access control unit 3359 in the cell B 3050 to acquire the meeting material. The access control unit 3359 confirms that the user A (organizer) has the right to Read the meeting material, by referring to the role 3253, acquires (reads) the meeting material stored in the database 3254, and transmits the meeting material to the data read unit 3321 in the cell A 3000. Thus, the user A (organizer) may acquire the meeting material. As a result, sharing the meeting material is realized.

In this way, with the configuration of sharing the meeting material, the data and the right may be changed with a change in information (situation) on the data disclosure side. The organizer may preset conditions for date determination processing once the material for the participants is disclosed, so that the date for the meeting is determined as soon as all the participants are ready for the meeting. The participants may also disclose the material to the organizer upon completion of preparation of the material.

The date determination processing may be performed when the material is disclosed to the organizer by all the participants. When the material is not disclosed even after a certain period of time, the participants who have not performs the disclosure may be notified or the meeting of the participants may be postponed.

FIG. 30D illustrates sharing a location 10 minutes before a meeting. In FIG. 30D, again, a cell A 3000 is a PDS of a user A (organizer) and a cell B 3050 is a PDS of a user B (participant) as in the case of FIGS. 30A to 30C. As for the user A (organizer), a relation "organizer" is built up with the user B (participant).

(1) A role request unit 3314 transmits account information and role information of the user A (organizer) to a role determination unit 3355 in the cell B 3050, and requests the right to acquire the location 10 minutes before the meeting.

(2) The role determination unit 3355 transmits a relation acquisition request to the relation acquisition unit 3356. Upon receipt of the relation acquisition request, the relation acquisition unit 3356 determines whether or not a relation (database (account relation map)) 3252 includes a relation matching with the account information, and notifies the role determination unit 3355 to the effect that the user A (organizer) has the relation "organizer". Upon receipt of the notification, the role determination unit 3355 gives the user A (organizer) the right to acquire the location 10 minutes before, and updates the role (database (account role map)) 3253 to link the account (user A) and the role (right to acquire the location 10 minutes before).

(3) Next, when the user A (organizer) requests a data read unit 3321 in the cell A 3000 to acquire (read) the location of the user B (participant), the data read unit 3321 requests an access control unit 3359 in the cell B 3050 to acquire the location. The access control unit 3359 confirms that the user A (organizer) has the right to acquire the location 10 minutes before, by referring to the role 3253, acquires (reads) information on the location stored in the database 3254, and transmits the information to the data read unit 3321 in the cell A 3000. Thus, the user A (organizer) may acquire the location of the user B (participant). As a result, sharing the location 10 minutes before is realized.

In this way, the configuration of sharing the location 10 minutes before the meeting allows, for example, a subordinate to set a rule and scripts for building up a relation with a superior requesting participation for a schedule meeting as an organizer by approving the participation in the scheduled meeting. The subordinate approves the participation in the schedule requested by the superior. With this approval, the relation with the superior as the organizer may be set according to the rule.

When the superior transmits a message requesting the right to acquire the location information 10 minutes before the meeting, the subordinate may automatically approve the right after starting an automatic approval script upon receipt of the message and making a determination on the relation (organizer). Thus, the superior may have the location information acquisition right automatically set to enable access to the location information of the subordinate. Upon completion of the meeting, the right given to the superior and the relation thereof (meeting organizer) may be discarded.

The information processing method described in this embodiment may be realized by a personal computer or a computer such as a work station executing programs prepared beforehand. A display control program is recorded in a computer-readable recording medium, such as a hard disk, a flexible disk, a compact disc (CD)-ROM, a magneto-optical disk (MO), a digital versatile disk (DVD), and a universal serial bus (USB) memory, and is read from the recording medium and executed by the computer. The display control program may also be distributed through a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. An information processing apparatus comprising:
a memory, and a processor coupled to the memory and configured to control, in an event of access to personal data of a user in a case where the personal data is stored in a data region for each individual user, an access right to access the personal data of the user for an account that accesses the personal data of the user, based on a relation between the account and the user and a situation in which the account accesses the personal data of the user, wherein the access right is approved for the account when the access by the account satisfies a condition for the situation, where the condition is determined based on the personal data of the user.

2. The information processing apparatus according to claim 1, wherein the access right is approved for the account when the account satisfies a condition for the relation.

3. The information processing apparatus according to claim 2, wherein the access right is approved when approval from the user is obtained.

4. The information processing apparatus according to claim 1, wherein the memory stores the access right and conditions for the relation and the situation for the access right in association with each other, and the processor controls the access right based on the stored conditions.

5. The information processing apparatus according to claim 2, wherein the processor is further configured to build up the relation between the account and the user based on a predetermined rule, and to determine whether or not the account satisfies the condition for the relation, based on information on the built-up relation between the account and the user.

6. An information processing system comprising a first server including a first memory and a first processor coupled to the first memory, and a second server including a second memory and a second processor coupled to the second memory, wherein, in an event where the first processor accesses personal data of a user in the second server through a network in a case where the personal data is stored in a data region of the second memory for each individual user, the second processor controls, wherein the access right is approved for the account when the access by the account satisfies a condition for the situation, where the condition is determined based on the personal data of the user.

7. The information processing system according to claim 6, wherein the second processor stores in the second memory the access right and conditions for the relation and the situation for the access right in association with each other, and controls the access right based on the stored conditions.

8. A non-transitory computer-readable storage medium storing an information processing program for causing a computer to control, in an event of access to personal data of a user in a case where the personal data is stored in a data region for each individual user, an access right to access the personal data of the user for an account that accesses the personal data of the user, based on a relation between the account and the user and a situation in which the account accesses the personal data of the user, wherein the access right is approved for the account when the access by the account satisfies a condition for the situation, where the condition is determined based on the personal data of the user.

\* \* \* \* \*